(12) United States Patent
Noerpel et al.

(10) Patent No.: US 9,991,944 B2
(45) Date of Patent: Jun. 5, 2018

(54) HIGH ALTITUDE PLATFORM WITH MULTIBEAM COVERAGE FOR AERO-BASED TERMINALS

(71) Applicant: Hughes Network Systems, LLC, Germantown, MD (US)

(72) Inventors: Anthony Robert Noerpel, Lovettsville, VA (US); Stanley Edward Kay, Rockville, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 303 days.

(21) Appl. No.: 14/597,762

(22) Filed: Jan. 15, 2015

(65) Prior Publication Data

US 2016/0211908 A1 Jul. 21, 2016

(51) Int. Cl.
*H04B 7/185* (2006.01)
(52) U.S. Cl.
CPC ............... *H04B 7/18506* (2013.01)
(58) Field of Classification Search
None
See application file for complete search history.

(56) References Cited

U.S. PATENT DOCUMENTS

| | | | | |
|---|---|---|---|---|
| 5,017,925 A | * | 5/1991 | Bertiger | ........... H01Q 1/081 342/352 |
| 5,825,325 A | * | 10/1998 | O'Donovan | ....... H04B 7/18521 342/353 |
| 6,201,797 B1 | | 3/2001 | Leuca et al. | |
| 7,068,974 B1 | * | 6/2006 | Linsky | ................ H04B 7/2041 370/316 |
| 2002/0145562 A1 | | 10/2002 | McLain et al. | |

(Continued)

FOREIGN PATENT DOCUMENTS

| | | |
|---|---|---|
| WO | 9733790 | 9/1997 |
| WO | 2000014902 | 3/2000 |
| WO | 2014/001837 | 1/2014 |

OTHER PUBLICATIONS

Maini et al, Satellite Technology, Principles and Applications, Wiley, 2014.*

(Continued)

*Primary Examiner* — James Yang
(74) *Attorney, Agent, or Firm* — K&L Gates LLP

(57) ABSTRACT

A description of a high altitude platform with multibeam coverage for aero-based terminals is provided herein. An example apparatus includes a plurality of user link antennas each configured to provide communication coverage among a plurality of aero-based terminals within a specified volume (or area) of the sky, each antenna being configured to communicate with a specified cell within the specified volume. The apparatus also includes a gateway link antenna configured to provide communication coverage to a ground-based gateway terminal. The user link antennas are configured to have differently sized apertures to maintain a similar spectral density among the cells within the specified coverage area. Such a configuration of user link antennas provides consistent Quality of Service and bandwidth for aero-based terminals (such as private and commercial aircraft) operating within the specified coverage area.

23 Claims, 18 Drawing Sheets

(56) References Cited

U.S. PATENT DOCUMENTS

| | | | | |
|---|---|---|---|---|
| 2003/0207684 | A1* | 11/2003 | Wesel | H04B 7/18578 455/427 |
| 2009/0057492 | A1* | 3/2009 | Harris | B64G 1/222 244/164 |
| 2014/0195150 | A1* | 7/2014 | Rios | B64C 39/024 701/469 |
| 2015/0009891 | A1 | 1/2015 | Miller et al. | |

OTHER PUBLICATIONS

Angeletti et al, Smart Gateways, 2012, ids.*
International Search Report—PCT/US2016/013238 dated May 20, 2016—5 pages.
Written Opinion—PCT/US2016/013238 dated May 20, 2016—8 pages.
Angeletti et al., "Smart Gateways Concepts for High-Capacity Multi-beam Networks", American Institute of Aeronautics and Astronautics (18 pages).
De Sanctis et al., "Feasibility Study of an Aeronautical-Satellite Broadband Communications Experiment", IEEE, 2008 (5 pages).
Evans et al., Prospects for Commercial Satellite Services at Q- and V-Bands, IEEE, 1998 (7 pages).
Gharanjik et al., "Larger Scale Transmit Diversity in Q/V Band Feeder Link with Multiple Gateways", IEEE, 2013 (5 pages).
Gharanjik et al., "Gateway Switching in Q/V Band Satellite Feeder Links", IEEE Communications Letters, vol. 17, No. 7, Jul. 2013 (4 pages).
Ho et al., "Q/V Band Satellite Feeder Links" (11 pages).
Kyrgiazos et al., "Gateway Diversity scheme for a Future Broadband Satellite System", 6th Advanced Satellite Multimedia Systems Conference, 2012 (8 pages).
Kyrgiazos et al., "On the Gateway Diversity for High Throughput Broadband Satellite Systems", IEEE Transactions Wireless Communications, Oct. 2014, vol. 13, No. 10 (16 pages).
Thompson et al., "Concepts and Technologies for a Terabit/s Satellite", The Third International Conference on Advances in Satellite and Space Communications, 2011 (8 pages).

* cited by examiner

| Input design parameter | value |
|---|---|
| frequency (GHz) | 30 |
| height of HAP (km) | 20 |
| radius of Earth (km) | 6371 |
| total # cells | 73 |
| cells in outer ring | 36 |
| spectrum allocation | 300 |
| polarization reuse | 2 |
| Frequency channels | 8 |
| available spectrum per cell | 37.5 |
| Maximum coverage radius (km) | 350 |
| # aircraft per HAP coverage area | 96 |
| user terminal parameters | |
| receiver noise figure (dB-K) | 3.5 |
| receiver Noise temperature (K) | 360. |
| elevation beam width (degrees) | 13.8 |
| azumith beamwidth (degrees) | 5.5 |
| antenna height (inches) | 2 |
| antenna width (inches) | 5 |
| Gain (dBi) | 26 |
| propagation parameters | |
| gas losses at edge of coverage (dB) | 0.56 |
| | |
| spectral rolloff | 10% |
| overhead | 12.5% |

| Modcod | Eb/No | mod index | code rate | Modcod | Eb/No | mod index | code rate | Modcod | Eb/No | mod index | code rate |
|---|---|---|---|---|---|---|---|---|---|---|---|
| BPSK 1/5 R2 | -9.78 | 2 | 0.1 | QPSK 8/9 | 7 | 4 | 0.88889 | 16APSK 31/36 | 14.19 | 16 | 0.86111 |
| BPSK1/4 R2 | -8.59 | 2 | 0.125 | QPSK 9/10 | 7.24 | 4 | 0.9 | 32APSK 13/18 | 14.79 | 32 | 0.72222 |
| BPSK1/5 | -6.77 | 2 | 0.2 | 8PSK 2/3 | 7.39 | 8 | 0.66667 | 16APSK 8/9 | 15.14 | 16 | 0.88889 |
| BPSK1/4 | -5.58 | 2 | 0.25 | 8PSK 25/36 | 7.93 | 8 | 0.69444 | 16APSK 9/10 | 15.45 | 16 | 0.9 |
| BPSK1/3 | -4.29 | 2 | 0.33333 | 8PSK 13/18 | 8.42 | 8 | 0.72222 | 32APSK 3/4 | 15.56 | 32 | 0.75 |
| QPSK 2/9 | -2.76 | 4 | 0.22222 | 8PSK 3/4 | 8.83 | 8 | 0.75 | 32APSK 7/9 | 15.89 | 32 | 0.77778 |
| QPSK 1/4 | -2.03 | 4 | 0.25 | 16APSK 26/45 | 9.18 | 16 | 0.57778 | 32APSK 4/5 | 16.54 | 32 | 0.8 |
| QPSK 13/45 | -1.6 | 4 | 0.28889 | 16APSK 3/5 | 9.38 | 16 | 0.6 | 32APSK 5/6 | 17.27 | 32 | 0.83333 |
| QPSK 1/3 | -0.78 | 4 | 0.33333 | 16APSK 28/45 | 9.75 | 16 | 0.62222 | 64APSK 13/18 | 18.03 | 64 | 0.72222 |
| QPSK 2/5 | 0.06 | 4 | 0.4 | 16PSK 23/36 | 10.04 | 16 | 0.63889 | 64APSK 3/4 | 18.42 | 64 | 0.75 |
| QPSK 9/20 | 0.69 | 4 | 0.45 | 8PSK 5/6 | 10.4 | 8 | 0.83333 | 32APSK 8/9 | 18.98 | 32 | 0.88889 |
| QPSK 1/2 | 1.47 | 4 | 0.5 | 16PSK 2/3 | 10.68 | 16 | 0.66667 | 64APSK 7/9 | 19.09 | 64 | 0.77778 |
| QPSK 11/20 | 1.97 | 4 | 0.55 | 16APSK 25/36 | 11.04 | 16 | 0.69444 | 32APSK 9/10 | 19.37 | 32 | 0.9 |
| QPSK 3/5 | 2.72 | 4 | 0.6 | 16APSK 13/18 | 11.52 | 16 | 0.72222 | 64APSK 4/5 | 19.54 | 64 | 0.8 |
| QPSK 2/3 | 3.67 | 4 | 0.66667 | 8PSK 8/9 | 11.95 | 8 | 0.88889 | 64APSK 5/6 | 20.44 | 64 | 0.83333 |
| QPSK 3/4 | 4.68 | 4 | 0.75 | 16APSK 3/4 | 12.07 | 16 | 0.75 | 64APSK 31/36 | 21.08 | 64 | 0.86111 |
| QPSK 4/5 | 5.36 | 4 | 0.8 | 8PSK 9/10 | 12.24 | 8 | 0.9 | 256APSK 2/3 | 22 | 256 | 0.66667 |
| QPSK 5/6 | 5.88 | 4 | 0.83333 | 16APSK 7/9 | 12.52 | 16 | 0.77778 | 256APSK 25/36 | 22.96 | 256 | 0.69444 |
| 8PSK 3/5 | 6.25 | 8 | 0.6 | 16APSK 4/5 | 12.98 | 16 | 0.8 | 256APSK 13/18 | 23.72 | 256 | 0.72222 |
| 8PSK 23/36 | 6.96 | 8 | 0.63889 | 16APSK 5/6 | 13.64 | 16 | 0.83333 | | | | |

HIGH ALTITUDE PLATFORM WITH MULTIBEAM COVERAGE FOR AERO-BASED TERMINALS

BACKGROUND

Currently, in-flight communications services for commercial and private aircraft are provided by geostationary earth orbit satellites and/or ground to air terminals. Such in-flight systems, while effective, have a number of disadvantages. For instance, communication coverage from satellites requires that aircraft include large aperture steerable antennas mounted on the aircraft fuselage. These antennas may be mechanically-steered, in which case they must be contained within radomes for protection from the elements. However, radomes create air drag on the airplane, which increases fuel consumption. The antennas may alternatively be electronically steered, in which case they may have limited scan angles that limits their deployment to low latitudes and limit their longitudinal coverage. Also, in order to have as low a profile as possible, the antennas are configured to have a broader beam in one dimension with increased sidelobe levels. These higher sidelobes create potential interference with adjacent satellites on the geostationary arc requiring more frequent handovers. Additionally, the capacity of such systems operating typically in the Ku and Ka bands is low because of the available spectrum and competition with satellite-to-ground coverage.

Communications services to aircraft may also be provided by ground-based gateway stations that communicate directly with the aircraft. This ground-to-air service is limited by available spectrum typically at the S-band. Known ground-to-air service has a limited throughput of about 3 Mbps per aircraft. Also, known ground-to-air links are susceptible to rain and scintillation fading at low elevation angles because the signal goes through the low atmosphere.

SUMMARY

The present disclosure provides a new and innovative system, method, and apparatus for providing multibeam coverage to connect aero-based terminals installed on aircraft to the Internet (or other communication services) via ground-based gateway stations using a telecommunications platform such as a High Altitude Platform ("HAP") or a Low Earth Orbit ("LEO") satellite platform. The example system, method, and apparatus disclosed herein use differently dimensioned antennas (e.g., antennas with differently sized apertures) to create cells with substantially the same bandwidth and quality of service ("QoS") within a specified coverage area or volume. Communications links between aero-based terminals and one or more gateway stations are provided by one or more stationary spot beams from a mechanically or electronically pointed antenna. The differently dimensioned/configured antennas provide corresponding different spot beams that compensate for the distance and subtended angle of each cell. This configuration of using differently dimensioned antennas produces a spectral density (e.g., a user data rate) that is generally constant throughout a coverage area/volume of the platform, which provides substantially uniform communication coverage among the different cells and a consistent user-perceived QoS. Different sized antenna apertures may also be achieved with a single antenna having multiple feeds or a suitably designed phased array antenna.

In an example embodiment, a telecommunications platform or transceiver apparatus (e.g., a HAP) includes at least one gateway link antenna and a plurality of user link antennas configured to provide communication links between at least one ground-based gateway terminal and a plurality of aero-based user terminals (e.g., terminals installed on aircraft) within a specified coverage area. Each of the user link antennas are configured to communicate with any aero-based terminals within a specified cell of the specified coverage area. Additionally, each gateway link antenna is configured to communicate with a specific ground-based gateway terminal. The telecommunications platform is communicatively coupled to a system configuration management apparatus, which includes logical links to other platforms, gateways, and user terminals (ground-based or aero-based) to receive status and other management information and to download/upload configuration and provisioning parameters. The system configuration management apparatus also includes system design planning and updating functions. As discussed herein, planning includes the determination of cell numbers/sizes and an assigned frequency plan. Based on the cell sizes, the system configuration management apparatus may design differently sized aperture antennas for the telecommunications platform (satellite or HAP) to maintain a similar QoS among the cells within the specified area to meet specified design criteria.

In another example embodiment, a method to provision a telecommunications platform includes determining an altitude at which the telecommunications platform will operate. The method also includes determining a coverage area of the telecommunications platform based on the altitude and the minimum elevation angle, partitioning the coverage area into substantially equal-sized cells, and assigning an antenna to each of the cells. The method further includes determining a beamwidth and an elevation angle for each antenna to provide communication coverage to the corresponding cell and determining an aperture for each of the antennas based on the beamwidth and the elevation angle. The method may also include determining an optimal design for the telecommunications platform to account for altitude changes, which may cause the cell sizes on the ground and/or within the air to vary.

Additional features and advantages of the disclosed system, method, and apparatus are described in, and will be apparent from, the following Detailed Description and the Figures.

BRIEF DESCRIPTION OF THE FIGURES

FIG. 10 shows a diagram of parametric inputs to a design process implemented by a system configuration manager, according to an example embodiment of the present disclosure.

FIG. 12 shows a diagram of modulation and coding schemes used in the DVB-S2 standard, according to an example embodiment of the present disclosure.

DETAILED DESCRIPTION

Figure 1:
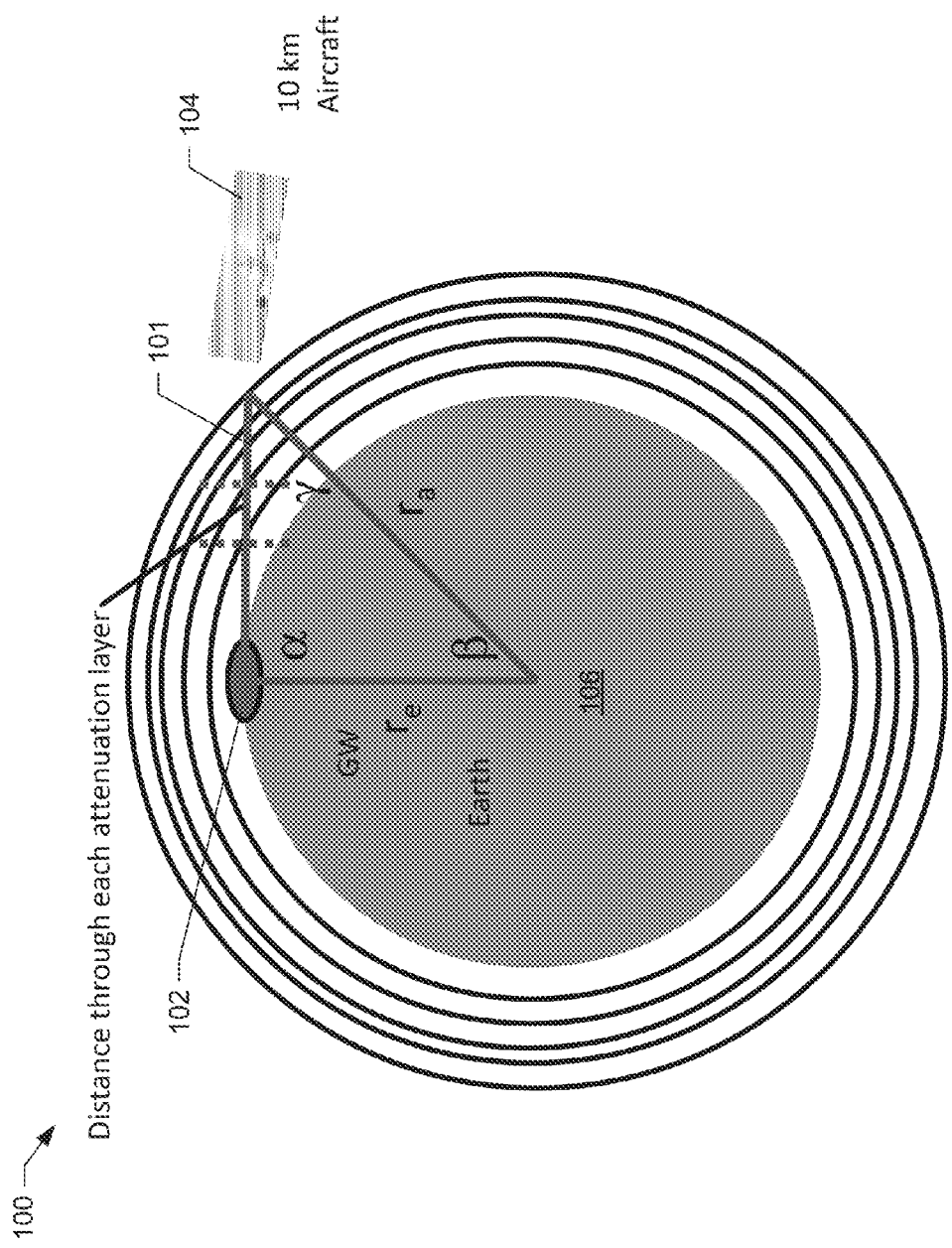
FIG. 1 shows a diagram of a propagation link between a prior art ground-based gateway station and an aero-based terminal.

The present disclosure relates in general to a method, apparatus, and system to provide multibeam coverage to aero-based terminals using a telecommunications platform. In particular, the example method, apparatus, and system disclosed herein use antennas with differently sized apertures to provide substantially consistent coverage among cells of a specified area or volume. For instance, antennas may be configured to have different apertures so as to cover cells of relatively the same area (or volume) and/or cells with substantially the same spectral density. The techniques described herein may achieve uniform or consistent coverage using individual antennas per spot beam. However, the techniques are also extensible to phased arrays and/or multiple single feed per beam arrays.

As discussed herein, antenna aperture is an effective area (orientated perpendicular to a direction of an incoming (or outgoing) radio wave) representative of how effective an antenna is at receiving (or transmitting) radio waves. Typically, the effective area of an antenna is 55% of the actual physical area of the antenna aperture. Additionally, as disclosed herein, the term 'platform' or 'telecommunications platform' refers to any Low Earth Orbit ("LEO") satellite, Medium Earth Orbit ("MEO") satellite, Geosynchronous Earth Orbit ("GEO") satellite, and/or HAP. A HAP may include any airship, airplane, balloon, etc. operating between, for example, 17 km and 22 km over the surface of the Earth that provides communication coverage (e.g., access to the Internet and cellular networks) to aero-based terminals. In some embodiments, an example HAP may provide hybrid coverage to both aero-based terminals and ground-based user terminals. A HAP or other telecommunications platform operates as a communication relay between one or more ground-based gateway terminals/hubs connected to a telecommunications network (e.g., the Internet) and a plurality of aero-based (and possibly ground-based) terminals.

Regulatory authorities have allocated the 47.2-47.5 GHz band and the 47.9-48.2 GHz band in either transmission direction for HAPs as a co-primary user. Additionally, regulatory authorities have allocated the 31.0 to 31.3 GHz band for ground to HAP as a secondary user and the 27.9 to 28.2 GHz band for HAP to ground as a secondary user. For example, in one embodiment, user terminals (e.g., aero-based terminals) use all of the 31.0 to 31.3 GHz band with polarization reuse to achieve a 600 MHz bandwidth in the uplink aero-based user terminal to HAP direction. The HAP uses the 27.9 to 28.2 GHz band with polarization reuse to achieve a 600 MHz bandwidth in the downlink HAP to aero-based user terminal direction. The frequency band between 47.2 and 47.5 GHz is used in the uplink between the ground-based gateway terminal and the HAP and the frequency between 47.9 and 48.2 GHz is used in the downlink between the HAP and the ground-based gateway terminal.

As disclosed herein, an aero-based terminal may be mounted on a private, commercial, or military aircraft and is capable of communicating with a HAP. The aero-based terminal may host a local area network ("LAN") that enables users traveling on the aircraft to connect personal user devices/terminals (e.g., smartphones, laptops, etc.) to the HAP. For instance, an aero-based terminal may include telecommunications equipment that relays communications between user devices/terminals of passengers and a HAP. The example HAP enables communication with a ground-based gateway terminal that is connected to, for example, the Internet.

Satellites and HAP provide communication coverage (e.g., wide-band coverage) over a specified coverage area and/or volume. The coverage area/volume includes the altitude at which aircraft fly, typically 10 km above the surface of the Earth. As discussed herein, a cell is a geographical portion of the coverage area and a spot beam is a radiation pattern of an antenna on the satellite or HAP that illuminates the cell. QoS for a cell is generally related to a spectral density (e.g., Hertz per square kilometer ("Hz/km$^2$") or Hertz per cubed kilometer ("Hz/km$^3$")) of the cell. The spectral density within the coverage area/volume is typically increased by increasing the number of radiated spot beams to partition the coverage area/volume into multiple cells and reusing the available spectrum many times. For instance, dividing an area previously covered by one broad beam into 19 cells covered by 19 narrow spot beams and splitting the frequency spectrum into four equal parts (and reusing the spectrum in smaller cells) results in a surface spectral density that is increased by a factor of 19/4 (nearly five-times). To provide broad and uniform coverage with a high spectral density, a satellite or HAP accordingly may use a plurality of antennas such that each antenna is configured to provide similar communication coverage (e.g., a spot beam) to a cell. Multiple beams from a single antenna may be created by using more than one duplex feed for each antenna. Multiple beams may also be formed by a phased array and/or beamforming techniques.

Currently in GEO and LEO satellite systems, antennas with identical dimensions and properties are chosen to reduce design variation. However, the variation of distances between a platform and various cells, resulting in part from the curvature of the Earth, leads to differently sized cells from identical antennas. For instance, cells directly below a satellite or HAP are relatively smaller compared to cells at the edges of a specified coverage area. If the same amount of spectrum is used in each cell then the spectral density is greater for the smaller cells below the platform compared to the surface spectral density of the larger cells at the outer edges of coverage. Differences in spectral density between cells can result in service disruptions and/or service degradations or a difference in the perceived QoS as an aero-terminal moves between cells. This cell size discrepancy is enhanced when the telecommunications platform is a LEO satellite or a HAP.

Communications with users in aircraft have been supported using GEO satellite systems and ground-based systems. The use of HAPs for communication with aircraft or user devices on aircraft has not previously been considered. However, technology to support high-speed and reliable wireless communication has not become available until recently. Additionally, technology to maintain HAPs within the air for extended periods of time has only recently become available. For instance, the energy density, weight, and size of batteries, fuel cells, and solar cells have become advanced enough to support continuous operation of an airship or blimp in the sky for 30 to 60 days or more.

HAPs have several potential advantages compared to higher altitude satellites. For instance, HAPs generally have a relatively low communication latency in the 100's of microseconds ("μsec") compared to latencies of 100's milliseconds ("msec") for GEO satellites and 10's msec for LEO satellites operating over 500 km. Additionally, HAPs have a shorter product development cycle time compared to satellites, which require space qualification in addition to engineering design that ensures continuous operation for an extended period of time (e.g., ten years). Also, launching a few GEO satellites or a large constellation of LEO satellites can be very expensive and high risk. This means that HAPs may be developed with less upfront capital investment than satellites. HAPs may also be repaired and/or upgraded relatively easily by landing the HAPs for service. In comparison, satellites cannot generally be repaired or upgraded once launched into space.

Further, HAPs may be provisioned one at a time so that a HAP-based communication system can be rolled out to different geographic areas at different times without affecting performance of other HAPs within the system. In contrast to HAPs, satellites are expensive and generally take several years to design, build, qualify, and launch before service can begin. LEO satellite systems also generally require that all satellites be provisioned at the same time to provide system wide coverage.

Another disadvantage of satellites is that there is generally too much capacity provided in low usage areas. Satellites have coverage areas that are relatively large where a sizable portion of the coverage area includes oceans, lakes, deserts, forests, and protected lands that have few (if any) users. Additionally, some LEO satellites spend a significant amount of time orbiting over oceans and other areas that include relatively few flight paths for aero-based terminals. Since a sizeable portion of the coverage area (and consequently bandwidth) is provided to sparsely populated areas, satellites have trouble providing enough capacity in relatively small high usage areas where the amount of bandwidth for that area is limited. In contrast, HAPs are deployed where there are large concentrations of aircraft (e.g., cities and preferred routes between cities), thereby providing service where there is the greatest demand/need.

A further disadvantage of satellites is the power and antenna size needed to provide high QoS communications. Satellites are generally thousands of kilometers above the surface, which requires high power output per antenna and larger antenna sizes to maintain acceptable QoS parameters. HAPs in contrast are much closer to the surface (e.g., 17 km to 22 km) and can provide the same (or better) QoS with lower power and smaller antennas.

Some HAPs have been proposed that use satellite communication technology including antennas and transceivers. These HAPs accordingly have antennas (or antenna elements) of the same size to provide spot beams to respective cells of a coverage area. These antennas provide spot beams with the same beam widths. However, the size of each cell under this antenna configuration varies significantly based on the location of the cell relative to the HAP. This cell area difference becomes larger for cells at the perimeter of the coverage area and becomes significantly pronounced for HAPs that operate at less than 30 km from the surface. Additionally, rain attenuation and atmospheric gas absorption both increase with the distance the signal propagates through the atmosphere or inversely with the user terminal elevation angle. These phenomena are location dependent as rain and water vapor depend on location of the coverage area on the surface of the Earth, which may vary from desert areas to high rain areas. Aero-based terminals that travel from an inner cell to an outer cell of a known HAP would experience a significant QoS degradation.

Additionally, in instances where the HAP position is substantially held constant by navigating in figure eights/circles, or flying into the wind, the cells may or may not move on the surface. The HAP may contain mechanisms for moving the on-board antennas to compensate for the HAP movement. The advantages of the uniform spectral density cells still apply in this case. This case, however, also allows for creating different spectral density cells if the users are not uniformly distributed over the coverage area.

As an alternative to satellites, some currently known systems use ground-based gateway stations to communicate directly with aero-based terminals. FIG. 1 shows a diagram 100 of a propagation link having a range 101 between a ground-based gateway station 102 and an aero-based terminal 104. The propagation link range 101 is shown as a side of a triangle, where the other two sides include the radius of the Earth ($r_e$) and the altitude of the aero-based terminal 104 in conjunction with the radius of the Earth ($r_a$). The triangle has angles of α, β, and γ. α is the angle between $r_e$ and the propagation link range 101, γ is the angle between the propagation link range 101 and $r_a$, and β is the angle between $r_a$ and the radius of the Earth $r_e$.

Figure 2:
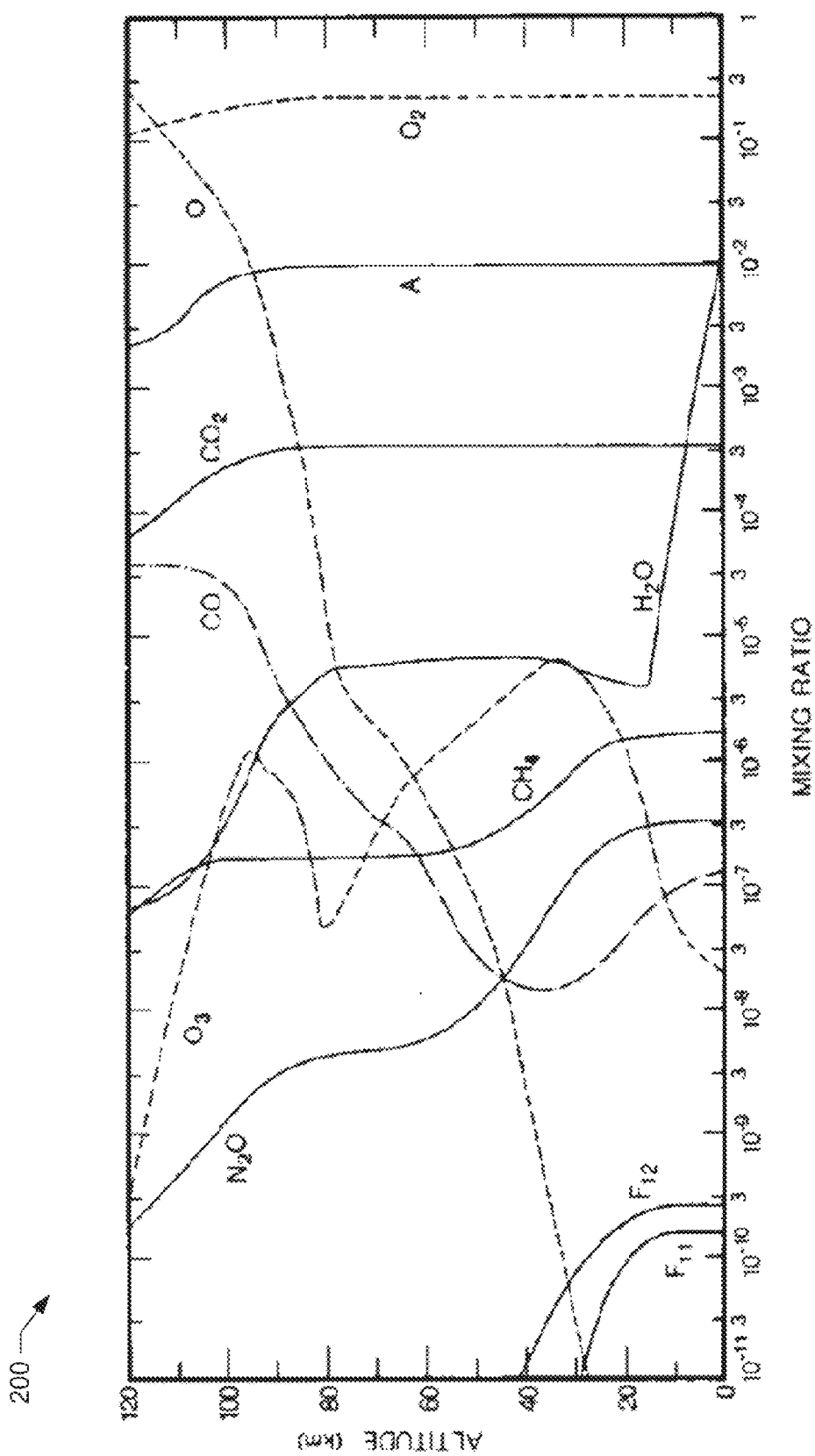
FIG. 2 shows a diagram of a graph that includes example densities of gases in the Earth's atmosphere at different altitudes.

To mirror real-world conditions, the propagation link range 101 is modeled as traveling through a layered atmosphere that encircles the Earth 106. FIG. 2 shows a diagram of a graph 200 that includes example densities of gases in the atmosphere at different altitudes. As shown in the graph 200, water vapor and water are concentrated near the surface of the Earth and are not well mixed in the atmosphere. For instance, at an altitude of 15 kilometers ("km") the partial pressure of water vapor is reduced by more than 3 orders of magnitude compared to the partial pressure at the surface of the Earth 106. Additionally, cloud height is typically at 12 km or less in the temperate zone. However, most of the attenuation associated with water vapor due to scintillation, clouds, and rain occur at less than 4 km.

Returning to FIG. 1, the aero-based terminal 104 has a typical altitude of 10 km above the surface of the Earth 106. At this 10 km altitude, communications between the aero-based terminal 104 and the ground-based gateway terminal 102 pass through the layers of the atmosphere, which increases signal loss and reduces QoS. Further, the maximum range of the link 101 between the ground-based gateway terminal 102 and the aero-based terminal 104 is limited due to geography and the curvature of the Earth.

The example telecommunications platform (e.g., HAP) disclosed herein reduces (or eliminates) the issues discussed above with satellite and ground based terminals by being positioned above the surface of the Earth to avoid atmosphere attenuation but below LEO or GEO satellites to avoid signal propagation delays and large path attenuation. The example telecommunications platform is also provisioned with different antenna apertures to provide consistent QoS and/or bandwidth as aero-based terminals move between cells throughout coverage area. The differently sized antennas compensate for the curvature of the Earth and differences in cell distance from the HAP.

Figure 3:
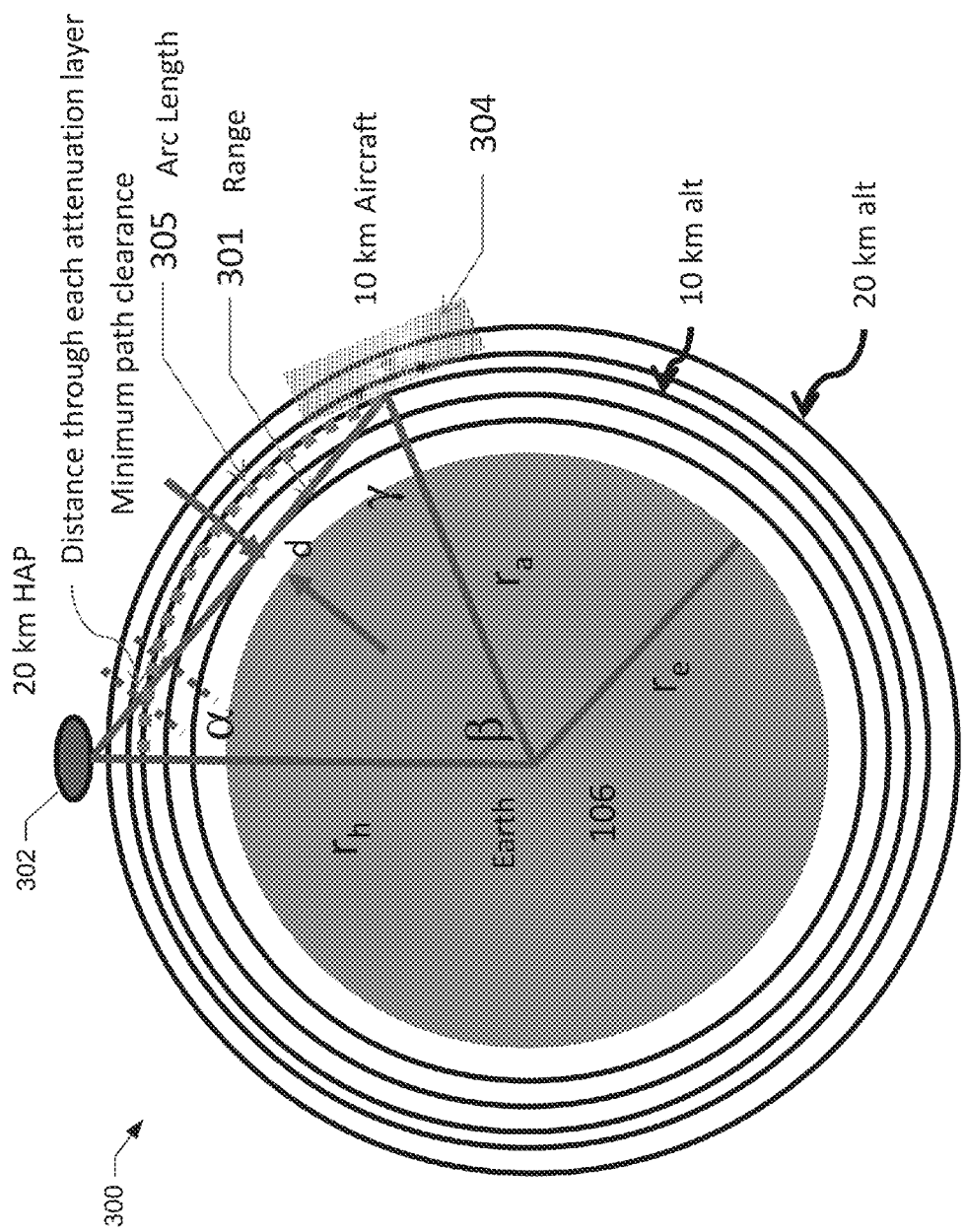
FIG. 3 shows a diagram of a propagation link between an example telecommunications platform (e.g., a HAP or a satellite) and a aero-based terminal, according to an example embodiment of the present disclosure.

FIG. 3 shows a diagram 300 of a propagation link 301 between an example platform 302 (e.g., a HAP or a satellite) and an aero-based terminal 304, according to an example embodiment of the present disclosure. In this example, the platform 302 is positioned about 20 km above the surface of the Earth 106 and the aero-based terminal 304 is approximated to have an altitude of 10 km. The HAP system illustrated in FIG. 3 has a range of 730 km where the propagation path 301 remains at least 4 km above the surface of the Earth 106. This 4 km clearance (shows as 'd' in FIG. 3) above the Earth 106 of the propagation link 301 avoids much of the atmosphere attenuation for millimeter wave communications described in conjunction with FIG. 2. In an alternative example, the HAP system may be configured to have a 5 km clearance above the Earth 106. In this alternative example, the HAP system has a range of 690 km. In both of the examples, all aero-based terminals less than about 350 km from the platform 302 have a clearance of 10 km above the Earth 106.

Figure 4:
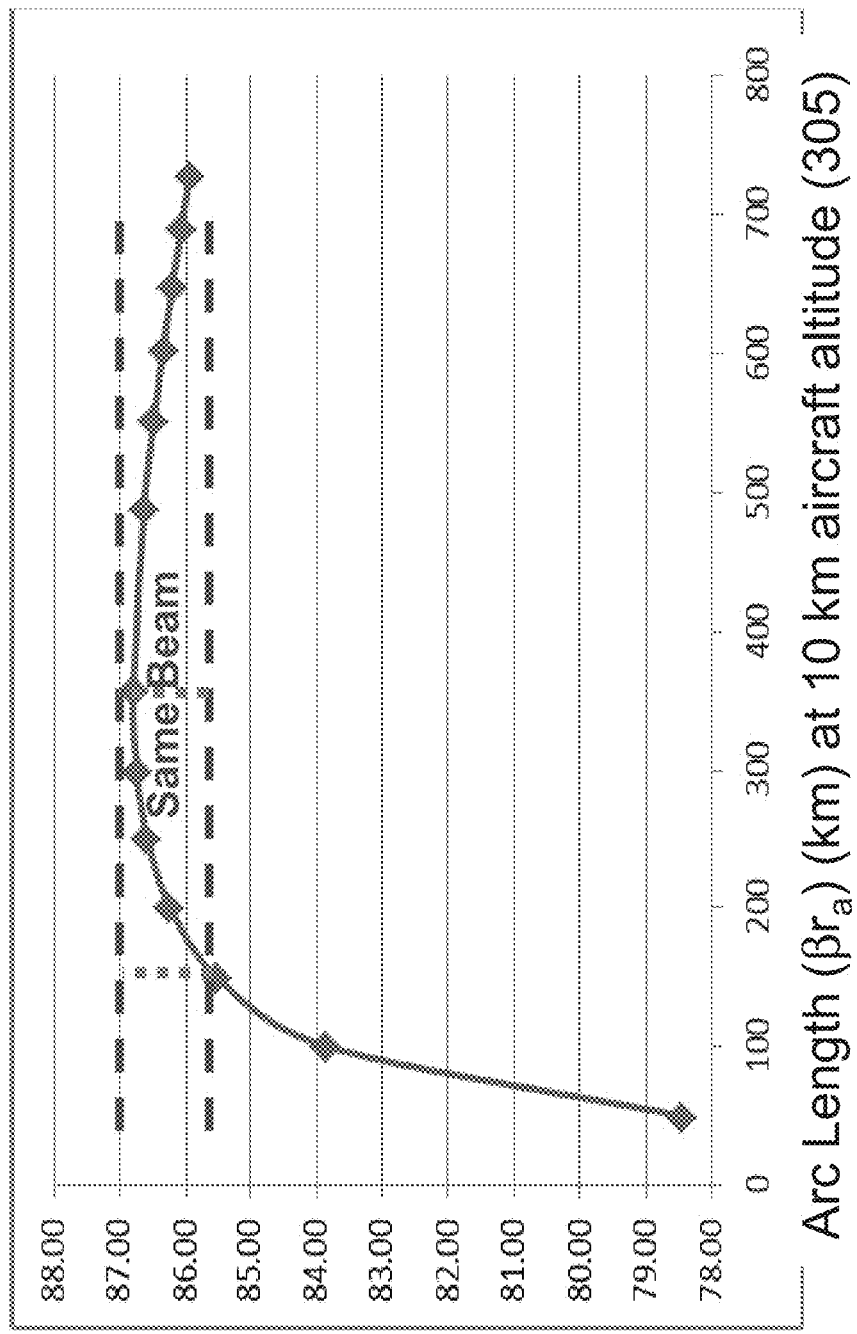
FIG. 4 shows a graph that illustrates a relationship between an angle α of the propagation link at the example platform of FIG. 3 based on an arc length distance of the aero-based terminal from the platform, according to an example embodiment of the present disclosure.

In the example shown in FIG. 3, angle α, measured from the Nadir of the platform 302, has a maximum value of 86.8°. It should be appreciated that angle α is equal to about 86° for propagation links that have an arc length distance 305 or coverage area radius of 180 km and 700 km, as shown in graph 400 of FIG. 4. The graph 400 shows the relationship between angle α and the arc length 305 of the platform 302 assuming a 10 km altitude of the aero-based terminal 304. In this embodiment, the coverage radius is equal to β of FIG. 3 in radians multiplied by $r_a$ of the aero-based user terminal 304. Such a configuration of the platform 302 relative to the ground 106 enables a single antenna with a beamwidth of 1° to cover an area of 1,440,000 $km^2$. However, as described in more detail below, the example HAP includes multiple antennas that partition a coverage area into a corresponding number of cells to provide consistent QoS and bandwidth.

An advantage of the example platform 302 is that there is considerable spectrum already allocated and available (e.g., 27.9 to 28.2 GHz, 31.0 to 31.3 GHz, and 47 GHz) for HAP-type telecommunication platforms. Further, the millimeter wave communications above an altitude of 4 km reduces (or significantly eliminates) rain and scintillation fading. The reduction or elimination of atmospheric attenuation enables a single HAP to cover a relatively large area, thereby reducing the total number of HAPs needed to provide aero-based communication coverage for the Continental United States ("CONUS").

Figure 5:
FIG. 5 shows a diagram of an example placement of HAPs across the continental United States, according to an example embodiment of the present disclosure.

FIG. 5 shows a diagram 500 of an example placement of HAPs 302 across the CONUS. The inner circles 502 show the range of possible gateway station locations for each coverage area/volume 504. For example, a ground-based gateway terminal may be located anywhere within the inner circle 502 and be configured to communicate with a HAP that provides coverage for aero-based terminals within the coverage area 504. In this example, assuming a maximum range of about 680 km for each platform 302, as few as 12 HAPs are needed to cover the entire CONUS. It should be appreciated that additional HAPs may be added to increase coverage reliability. Additionally or alternatively, the HAPs may be positioned based on commercial and/or private air routes over the CONUS. For example, HAPs could be positioned to provide more overlapping coverage along the northeast corridor and the central corridor of the CONUS. Such a configuration makes more bandwidth available to relatively congested areas.

HAP Communication Environment

Figure 6:
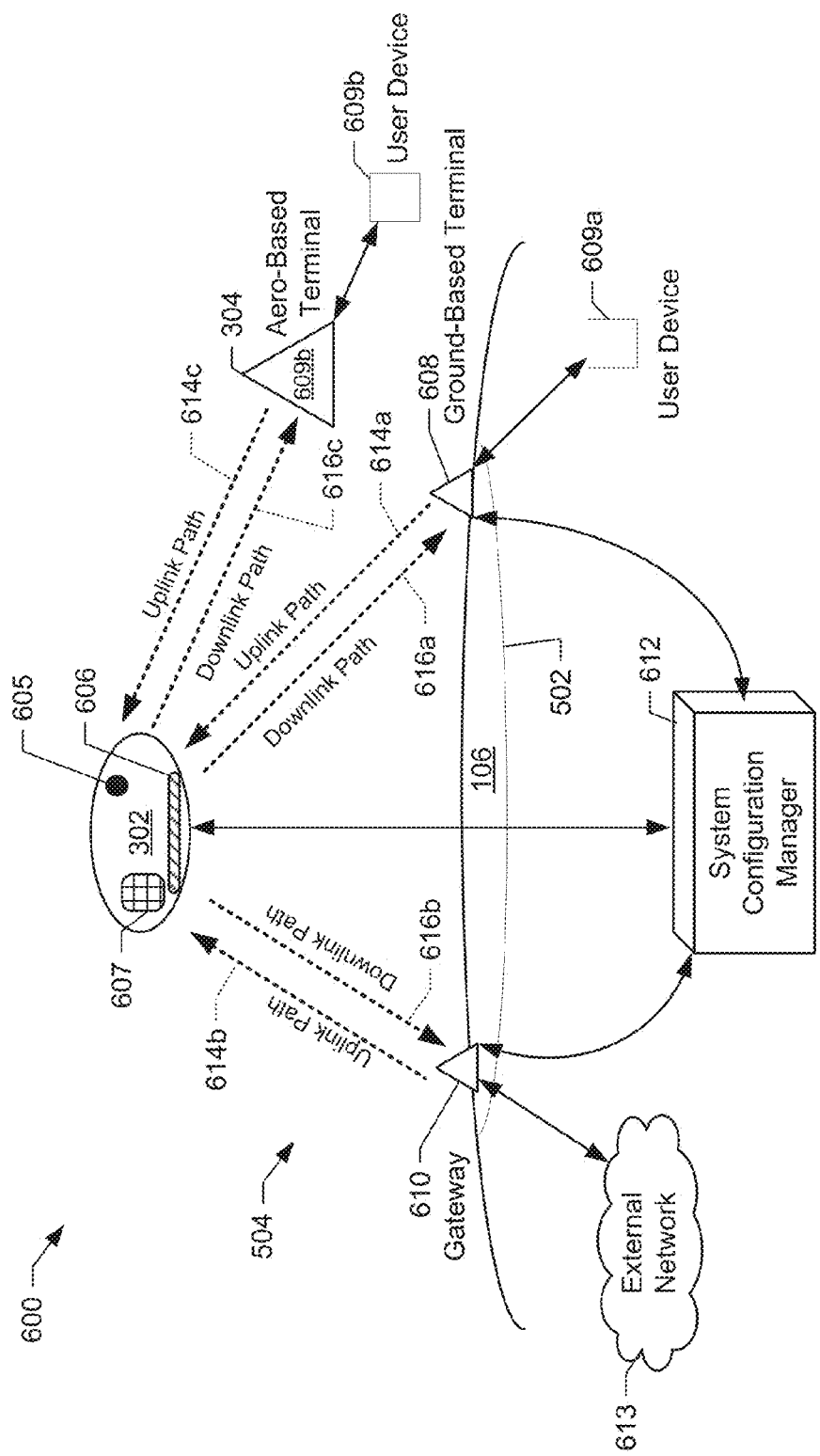
FIG. 6 shows a diagram of an example telecommunications system, according to an example embodiment of the present disclosure.

FIG. 6 shows a diagram of an example communication system 600, according to an example embodiment of the present disclosure. The example satellite communication system 600 includes the platform 302 (e.g., a HAP) configured to operate at a specified altitude above the Earth's surface 106. For instance, the platform 302 may operate between 17 to 22 km above the surface of the Earth. In other examples, the platform 302 may be replaced by any other suitable communications satellite.

The example platform 302 includes a switch 605, antennas 606 (e.g., user link antennas) in addition to hardware 607 (e.g., receiver, transmitter, modem, router, filter, amplifier, frequency translator computing device, processor, memory/buffer, etc.) to facilitate the relay of communications for aero-based terminals 304 and possibly ground-based terminals 608. The ground-based terminals 608 may be integrated with or connected to user devices 609a and the aero-based terminals may be integrated with or connected to user devices 609b. The example terminals 304 and 608 can include any device capable of communicating with the platform 302. The terminals 304 and 608 include, for example, an antenna, transceiver, and processor to facilitate the transmission of data with the platform 302. The terminals 304 and 608 may be connected to any user communications equipment or device such as a router, switch, phone or computer (e.g., the user devices 609). In an example, the aero-based terminal 304 is installed on a commercial aircraft and connected to the user devices 609b either directly or via a WLAN or LAN installed in the aircraft. The user devices 609b include, for example, smartphones, laptops, and other personal computing devices.

The example platform 302 is configured to route or relay communications between the aero-based terminals 304 within the coverage area/volume 504 and the gateway terminal 610 within the inner circle 502. In some embodiments, the platform 302 may be configured to route or relay communications between the aero-based terminals 304, the ground-based terminals 608, and/or the gateway terminal 610. To route or relay communications from the terminals 304 within the multiple cells of a coverage area, the platform 302 may have a transponder bent-pipe design. In some embodiments, the platform 302 may include processing, switching or routing capability so that circuits may be switched or individual packets may be routed between different cells. The communications signals transmitted to/from the platform 302 can be any combination of standard or proprietary waveforms. Additionally, the gateway terminal 610 can be connected to any combination of external communications networks 613 such as the Internet.

The example switch 605 and/or hardware 607 (e.g., a processor) is configured to support connectivity (e.g., mesh connectivity) between cells. For instance, the switch 605 may be configured to receive communication data from at least one of the gateway terminal 610 and the aero-based terminal 304 and determine a destination cell within a coverage area/volume for the communication data. The switch 605 then selects one of the plurality of antennas 606 corresponding to the destination cell to transmit the communication data and accordingly transmits the communication data via the selected antenna. In other embodiments the data could be sent to other HAPs, GEO/LEO satellites, or other aero-based terminals 304.

The example gateway terminal 610 includes any centralized transceiver connected to external network 613 (e.g., the PSTN, Internet, a LAN, a virtual LAN, a private LAN, etc.). The gateway terminal 610 may include one or more base stations, antennas, transmitter, receiver, processor, etc. configured to convert data received from the network 613 into signals for wireless transmission to the platform 302 and convert data received from the platform 302 into signals for transmission to the network 613. In some instances, the platform 302 may be in communication with more than one gateway terminal 610. Additionally or alternatively, the gateway terminal 610 may be in communication with more than one platform 302. In these instances, the gateway terminal 610 may select which platform 302 is to receive the data based on, for example, a destination of the data.

The example terminals 304 and 608 and the gateway terminal 610 are configured to communicate with the platform 302 via uplinks 614 downlinks 616. The links 614 and 616 use spot beams provided by the platform 302 to cover specified cells containing the terminals 304 and 608 and/or the gateway terminal 610. It should be appreciated that a spot beam may multiplex a plurality of signals on each uplink 614 and each downlink 616 based on the amount of terminals 304 and 608 and/or gateway terminals 610 transmitting or receiving data within a cell. Data is transmitted to the platform 302 from the ground-based terminals 608 via the uplink 614a and data is received from the platform 302 at the ground-based terminals 608 via the downlink 616a. Similarly, data is transmitted to the platform 302 from the aero-based terminals 304 via the uplink 614c and data is received from the platform 302 at the aero-based terminals 608 via the downlink 616c. Additionally, data is transmitted to the platform 302 from the gateway terminal 610 via the uplink 614b and data is received from the platform 302 at the gateway terminal 610 via the downlink 616b. The gateway terminal 610 sends communication signals to the aero-based terminal 304 using the platform 302 via a forward link comprising the uplink 614b and the downlink 616c and the aero-based terminal 304 sends communications signals to the gateway terminal 610 via a return link comprising the uplink 614c and the downlink 616b.

Mesh connectivity between terminals 304 and/or 608 is also possible depending on the capabilities of the communications platform, i.e., the platform 302 or a satellite. While the disclosure is not limited to any frequency, as disclosed above, certain frequency spectrums have been allocated for HAP communications by regulatory bodies. These allocated frequencies are used in the example discussed herein. The example embodiment assumes the uplink 614b uses a frequency band between 47.2 and 47.5 GHz, the downlink 616b uses a frequency band between 47.9 and 48.2 GHz, the uplink 614c uses a frequency band between 31.0 and 31.3 GHz and the downlink 616c uses a frequency band between 27.9 and 28.2 GHz.

Another possible embodiment assumes the uplink 614b may use a frequency band between 31.0 and 31.3 GHz and the downlink 616c uses a frequency band between 27.9 and 28.2 GHz and the uplink 614c and the downlink 616b use a frequency band between 47.2 and 47.5 GHz and 47.9 and 48.2 GHz. In the United States, the allocation includes the entire band between 47.2 and 48.2 GHz. The advantage of the first embodiment is that rain attenuation on the user links are easier to close with higher data rates. The advantage of the second embodiment is that more spectrum is available for the user data links. The disclosure is not restricted to either of these frequency plans and in the future other frequencies may become available for HAP communications. If the methods and apparatus of this disclosure are applied to LEO satellites, other spectrum is already available.

In addition to the spectrum allocation for HAPS primary and secondary use, underutilized spectrum exists in the Q and V bands. The HAPs disclosed herein may accordingly operate in the bands described above and/or the Q/V bands. Additionally, there have been proposals to serve aircraft from ground stations (or HAPs) using the Ku-band spectrum. It should be appreciated that spectrum around 90 GHz is uniquely applicable for HAPs-based service to aero-based terminals because of the large available bandwidth and acceptable losses at high altitudes.

As discussed in more detail below, the antennas 606 of the example platform 302 are configured to have different sizes (e.g., different size apertures) to take advantage of the relationship between angle α and aero-based terminal altitude discussed above on conjunction with FIG. 4. The antennas 606 are sized to create cells of substantially the same size to achieve a constant spectral density throughout a coverage area. To maintain consistent cell areas, antennas 606 covering outer cells are relatively larger (and consequently have more gain) than those antennas 606 coving interior cells. The increased gain for the antennas covering the outer cells compensates, in part, for the increased path loss from the greater distance to reach those outer cells. Further, the consistent cell sizes means that link margins between the terminals 304 and the platform 302 are similar, which means that antennas on the terminals 304 can be the same regardless of the location of the terminal within a coverage area.

A system configuration manager 612 of the communication system 600 is configured to determine a size for each of the apertures of the antennas 606. The system configuration manager 612 also determines the type of antennas provisioned and placement of the antennas 606 within the platform 302. The system configuration manager 612 includes any processor or system configured for designing, developing, and/or maintaining the switch 605, antennas 606, hardware 607, and other features of the platform 302. The system configuration manager 612 may determine a coverage area to be serviced by the platform 302 in addition to a number of antennas needed to provide acceptable bandwidth to terminals 304 and the size of the antennas to maintain spectral density uniformity among the cells. The system configuration manager 612 may also select the type of antenna including, for example, a reflector, array, open ended waveguide, dipole, monopole, horn, etc. The system configuration manager 612 may select the antenna type based on, for example, a desired spot beam size, bandwidth, gain, elevation angle relative to the surface or altitude of the aero-terminals 304, etc. The system configuration manager 612 may also select the size of the aperture of the antenna 606 based on the desired spot beam size, bandwidth, gain, elevation angle, etc. In some instances, the system configuration manager 612 may include a control link to configure the platform 302 (while the platform 302 is operational in the sky) based on a new set of coverage area and QoS parameters. Depending on the capability of the platform 302, such parameters may include new frequency assignments, new spot beam forming coefficients or new routing tables.

In addition to configuring the platform 302, the example system configuration manager 612 may also service and/or maintain the platform 302. For example, the system configuration manager 612 may transmit software updates while the platform 302 is operational in the sky. The system configuration manager 612 may also instruct the platform 302 to move to a new geographical location. The system configuration manager 612 may further instruct the platform 302 to return to the ground for maintenance, upgrades, service, antenna reconfiguration, etc. The system configuration manager 612 may communicate with the platform 302 via the gateway terminal 610 and/or a proprietary/private communication link. In some instances, the platform 302 may provide diagnostic and status information to the system configuration manager 612 via the proprietary/private communication link and/or through the gateway terminal 610 multiplexed with communications traffic.

Platform Coverage Area Embodiment

Figure 7:
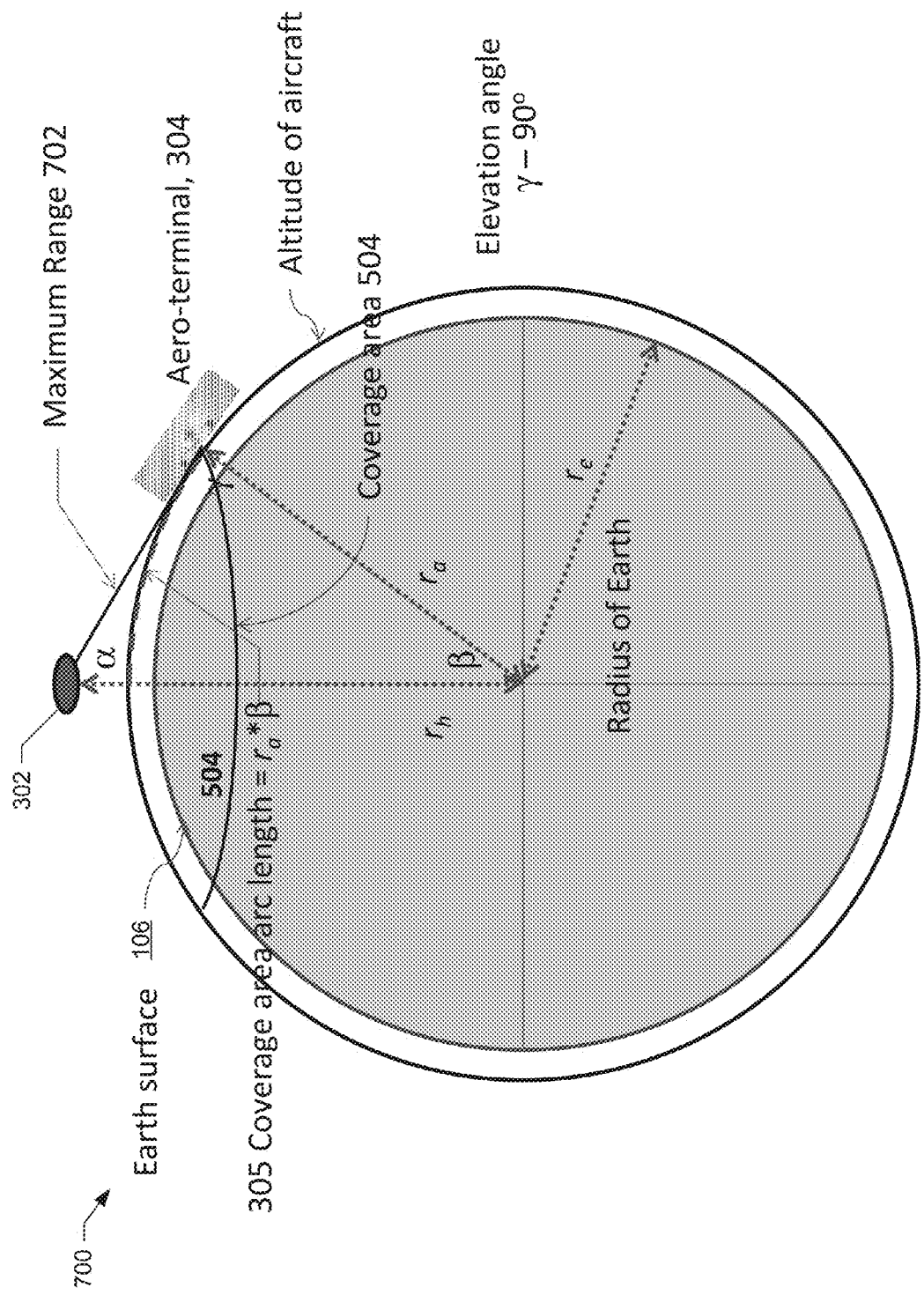
FIG. 7 shows a diagram of an example coverage area for the platform of FIGS. 3 to 6, according to an example embodiment of the present disclosure.

FIG. 7 shows a diagram 700 of an example coverage area 504 for the platform 302 discussed above in conjunction with FIGS. 3 to 6, according to an example embodiment of the present disclosure. In this example, the platform 302 operates at an altitude above the surface of the Earth 106, which may be any distance between, for example, 17 km and 22 km. A radius (e.g., the arc length distance 305) of the coverage area/volume 504 is equal to $r_a$ (e.g., the height of the aero-based terminals 104 being covered combined with the radius of the Earth $r_e$) multiplied by angle $\beta$ in radians.

The platform 302 provides communications for the coverage area 504 that falls within a maximum range 702 (e.g., the maximum range of the propagation link 301 of FIG. 3).

The maximum range 702 is based on the altitude of the platform 302, the altitude of the aero-based terminal 304, an acceptable elevation angle respective to the aero-based terminal 304, a clearance height (d) of the propagation link 301 over the surface of the Earth 106, and a desired link margin. The link margin is dependent on the available power of the platform 302, antenna gain of the antennas 606 of the platform 302, antenna gain of the aero-based terminal 304, link availability requirements, receiver gain of the aero-based terminal 304, and other equipment and link limitations.

It should be appreciated that the range 702 is different from the coverage area radius 305. The example range 702 is the RF line-of-sight propagation path of the propagation link 301 between the platform 302 and the aero-based terminal 304. In contrast, the coverage area radius 305 is measured along an arc of the surface of the Earth 106 from a sub-platform point to an edge of the coverage area 504. It should also be appreciated that the angle $\gamma$ varies based on an altitude of the aero-based terminal 304 and a distance between the platform 302 and the aero-based terminal 304.

Figure 8:
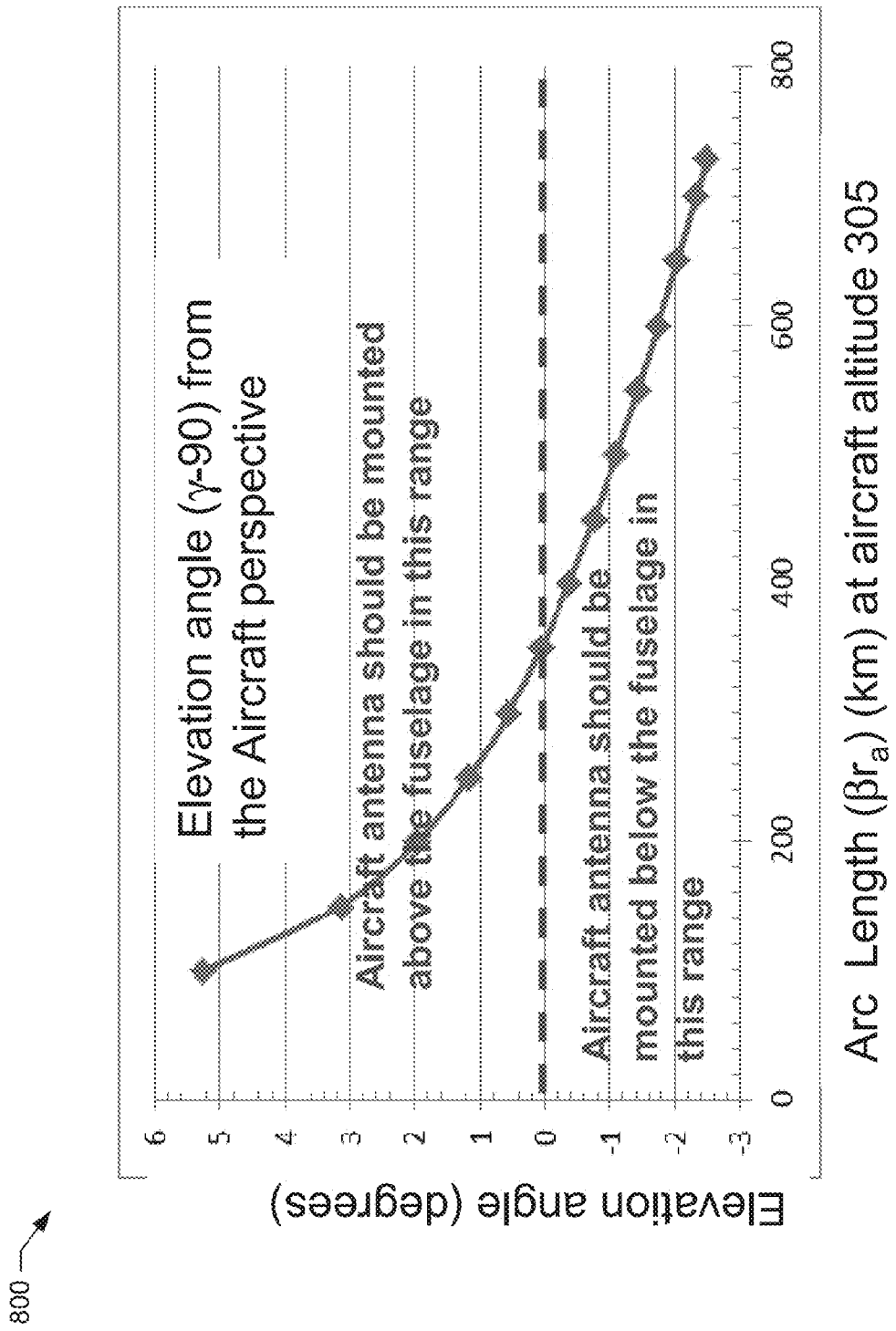
FIG. 8 shows a diagram of an example graph that illustrates a relationship between an elevation angle (e.g., an elevation angle (γ-90) degrees) at the aero-based terminal and an arc length distance between the example telecommunications platform and the aero-based terminal of FIGS. 3 to 7, according to an example embodiment of the present disclosure.

FIG. 8 shows a diagram of an example graph 800 that illustrates a relationship between elevation angle ($\gamma$-90 degrees) and a distance between the platform 302 and the aero-based terminal 304, according to an example embodiment of the present disclosure. The graph 800 indicates that aero-based terminals 304 may have a positive or negative elevation angle ($\gamma$-90 degrees) based on the distance of the terminal 304 from the platform 302 and an altitude of the terminal 304. For instance, an aero-based terminal 304 operating at 10 km will have a positive elevation angle ($\gamma$-90 degrees) when the terminal is less than 350 km from the platform 302 (assuming the platform is operating at 20 km). In contrast, the aero-based terminal 304 will have a negative elevation angle ($\gamma$-90 degrees) when the terminal is greater than 350 km from the platform 302. The aero-based terminal 304 will have to use an antenna mounted above the fuselage to communicate with the platform 302 at positive elevation angles and an antenna mounted below the fuselage to communicate with the platform 302 at negative elevation angles.

Figure 9:
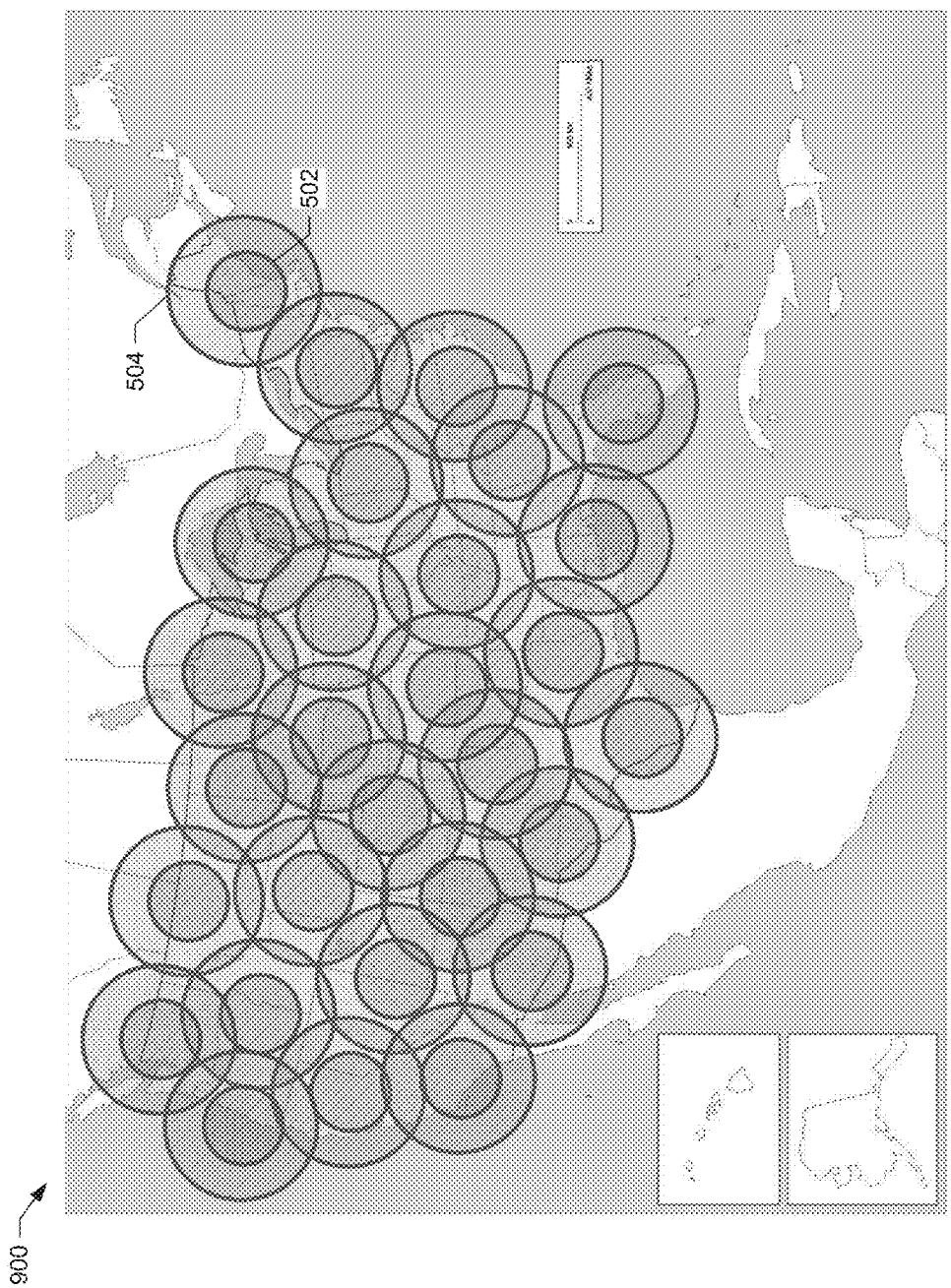
FIG. 9 shows a diagram of a second example placement of HAPs across the continental United States, according to an example embodiment of the present disclosure.

Depending on other system design constraints, it may be preferable to limit the coverage radius of the platform 302 to 350 km so that aero-based terminals 304 only need an antenna on top of the fuselage. In this case, the elevation angle is positive and d is equal to 10 km for all aero-terminals. However, the number of platforms 302 required to cover CONUS will increase from about 12 (as shown in FIG. 5) to about 29 (as shown in diagram 900 of FIG. 9). There are many other advantages to limiting the coverage radius per platform 302 to 350 km. For example, shorter maximum links between the platform 302 and the aero-based require less power, have higher user data rates, and may have more frequency spectrum options. For example, the 90 GHz band, which is between the oxygen absorption band centered at 60 GHz and the water vapor absorption band at 120 GHz, offers considerable unused spectrum currently unavailable for other applications. For instance, the platform 302 may use array antennas to distribute transmission power for the different cells, thereby enabling use of the 90 GHz band.

Example Communication System Design Parameters

As discussed above, the example platform 302 of FIGS. 3 to 9 includes antennas 606 with different sized apertures to provide a substantially uniform user-perceived QoS. The specific aperture dimensions of the antennas 606 are based on assumptions regarding available antenna technology (for the platform 302 and the aero-based terminal 304), deployment location of the platform 302, desired user-perceived QoS levels, and traffic patterns of the aero-based terminal 304. For example, one assumption includes aero-based terminals 304 uniformly distributed within the coverage area 504. The assumption also includes aero-based terminals 304 having similar antennas/transceivers independent of the terminals' location within the coverage area 504.

FIG. 10 shows a diagram of an example table 1000 of parametric inputs used by the system configuration manager 612 for provisioning the platform 302 of FIGS. 3 to 9 based on the above assumptions, according to an example embodiment of the present disclosure. It should be appreciated that the values shown in the table 1000 (e.g., frequency, receiver noise figure, receiver noise temperature, terminal antenna height, terminal antenna width, gain) may change over time with improvements in technology and new frequency spectrum allocations. It should also be appreciated that some of the values shown in the table 1000 are location dependent (e.g., rain fall statistics). Additionally, some of the parameter values are selected by a service provider (e.g., total number of cells, spectrum allocation, available spectrum per cell, maximum coverage radius, etc.). Despite any changes to the values in table 1000, the process executed by the system configuration manager 612 is the same for determining a number of antennas 606 for the platform, a type of the antennas, and an aperture size of the antennas.

The parameter values shown in the table 1000 are based on the use of 29 platforms 302 to cover the entire CONUS. Additionally, the parameter values are based on the use of the ka-band spectrum, which is currently available internationally for HAP service as a secondary user. The parameters are also based on the assumption that 300 MHz of bandwidth is available in the uplink and downlink directions. The antenna of the aero-based terminal 304 is assumed to have a height of 2 inches (5.08 centimeters ("cm") and a width of 5 inches (12.7 cm). This antenna assumption is based on the fact that antennas on aircraft are constrained to have a low profile to reduce drag. Accordingly, the height of the antenna of the aero-based terminal 304 is limited to 2 inches. Additionally, the antenna of the aero-based terminal 304 is assumed to be steerable through 360° in azimuth. Further, for this example, the coverage radius of the platform 302 is limited to 350 km so that the aero-based terminals 304 only need to have a top mounted antenna. The antenna of the aero-based terminal 304 may be achieved with a horn antenna, a reflector antenna illuminated by a small feed, or a fixed phased array antenna with dimensions of 2×5 inches. Such an antenna for the aero-based terminal 304 results in a 26.2 dBi gain and an antenna pattern with an elevation beamwidth of 13.8° and an azimuthal beamwidth of 5.5°. A receiver connected to the antenna of the aero-based terminal 304 is assumed to have noise figure of 3.5 dB corresponding to a noise temperature of 360° K.

Figure 11:
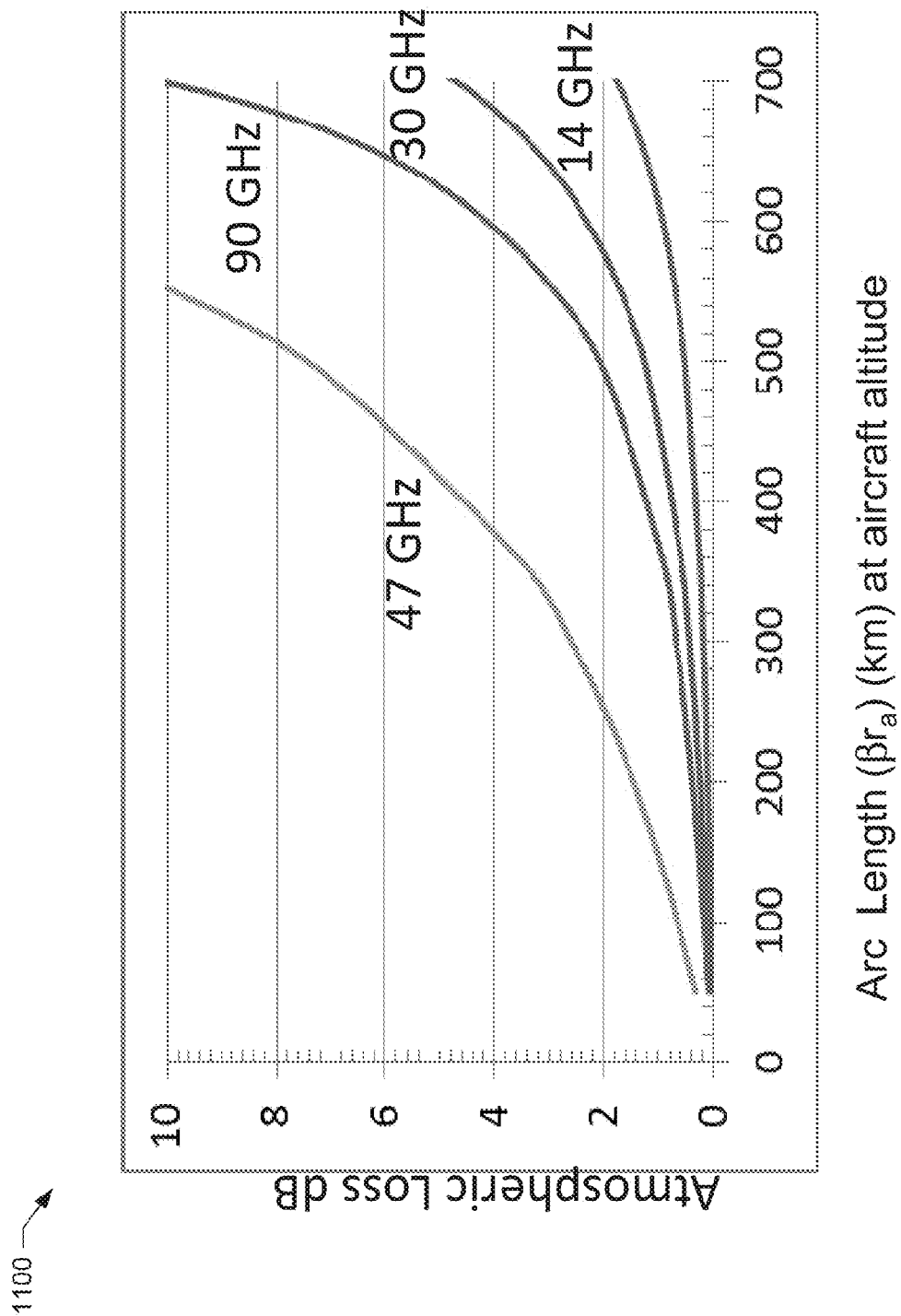
FIG. 11 shows a diagram of a graph that illustrates atmospheric loss for communications at various frequency bands using an ITU reference atmospheric model, according to an example embodiment of the present disclosure.

As mentioned above, atmospheric attenuation due to rain, clouds and gas absorption is generally dependent on geographic location but is dominated by oxygen absorption in the 50 and 70 GHz absorption bands. Oxygen is a well-mixed gas in Earth's atmosphere so location dependence is small. For the purposes of this example, the standard atmosphere described in International Telecommunication Union ("ITU") Recommendations at P.676, P.618, P.840, and P.838 is assumed. For each configuration of the platform 302, local atmospheric data, if available, may be used instead of the ITU standard atmosphere. This additional atmospheric loss is shown in graph 1100 of FIG. 11 as a function of the coverage radius 305 for the example embodiment for several frequency bands of interest.

In order to estimate the user data rate available at any possible aero-based terminal 304 location within the coverage area/volume 504, link budgets are computed assuming the same modulation and coding waveforms as used in the DVB-S2 standard. This data is given by table 1200 shown in FIG. 12, where the modulation and coding schemes are ranked by Eb/No. The DVB-S2 waveform is used for the example embodiment but the described process is not limited to this particular waveform. For this example, all links may use a QPSK rate of ½. Allocating the same spectrum and the same waveform ensures that each aero-based terminal 304 has the same available data rate regardless of location of the terminal within the coverage area 504.

A further assumption is made that the total power of the platform 302 is limited. For example, the platform 302 may achieve a total power output of a few hundred Watts. Since high power amplifiers have low efficiencies, this example assumes that only five Watts of total RF power is available at the transmitting flanges of the antennas 606. Power control is used to reduce the total transmit power while maintaining a uniform QoS even as the aero-based terminal 304 moves within the coverage area 504. In some instances, the platform 302 may be configured such that cells devoid of an aero terminal are not illuminated by the corresponding antenna 606. However, the antenna 606 may be activated after detecting or predicting an aero-based terminal is about to enter the cell.

The results of the system configuration process include design parameters for the platform 302 such as antenna apertures and required transmit power levels per cell. The input parameters may be re-evaluated if the links do not close at the edge of coverage or if excessive transmit power is required. For instance, design modifications include increasing the performance requirements on the aero-based terminal 304 (i.e., more antenna gain), using a different frequency with more available spectrum, reducing the size of the coverage area 504, using an alternative coverage area embodiment by partitioning the coverage area 504 into more cells, and/or increasing the aperture size and gain of the antennas 606 of the platform 302.

Figure 13:
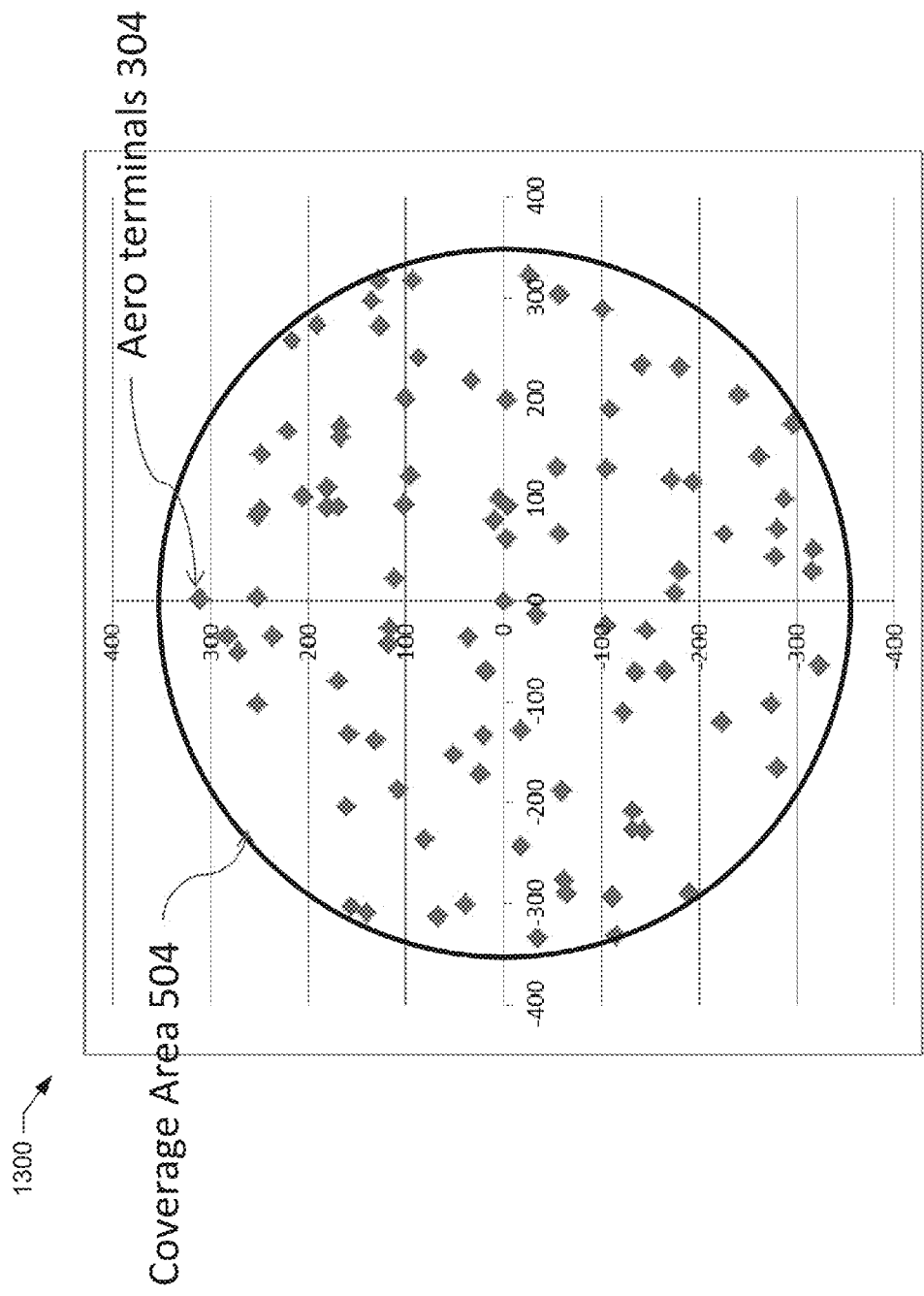
FIG. 13 shows a diagram of a coverage area that includes the location of 96 randomly positioned aero-based terminals, according to an example embodiment of the present disclosure.

The locations within the coverage area 504 of 96 randomly positioned aero-based terminals 304 are shown in FIG. 13, according to an example embodiment of the present disclosure. This distribution of aero-based terminals 304 is shown as an example and assumes a uniform distribution of terminals within the coverage area 504. However, aero-based terminals 304 in reality would typically follow proscribed routes between cities. For this example the positions of the aero-based terminals 304 are used in the link analysis to estimate total power required for the platform. Alternatively, for the purposes of the design of a HAP system, multiple aero-based terminal distributions using a Monte Carlo scheme as well as distributions accounting for preferred routes may be used to ensure the availability of a consistent user data rate is achieved by the platform 302. As shown in the diagram 900 of FIG. 9, it is apparent that there is considerable overlap between neighboring platforms so that some aero-based terminals 304 near the edge of coverage could actually be served by a neighboring platform 302.

In the example described, the resulting communication system 600 includes a uniform user data rate of 30.3 Mb/sec. In other words, each of the aero-based terminals 304 in FIG. 13 would experience a date rate of 30.3 Mb/sec throughout the coverage area 504. In addition, the total transmit power of the platform 302 measured at the platform's antenna flange is only five Watts, which is well within the expected available power for the platform 302.

Platform Design Embodiment Based on the Example System Design Parameters

Figure 14:
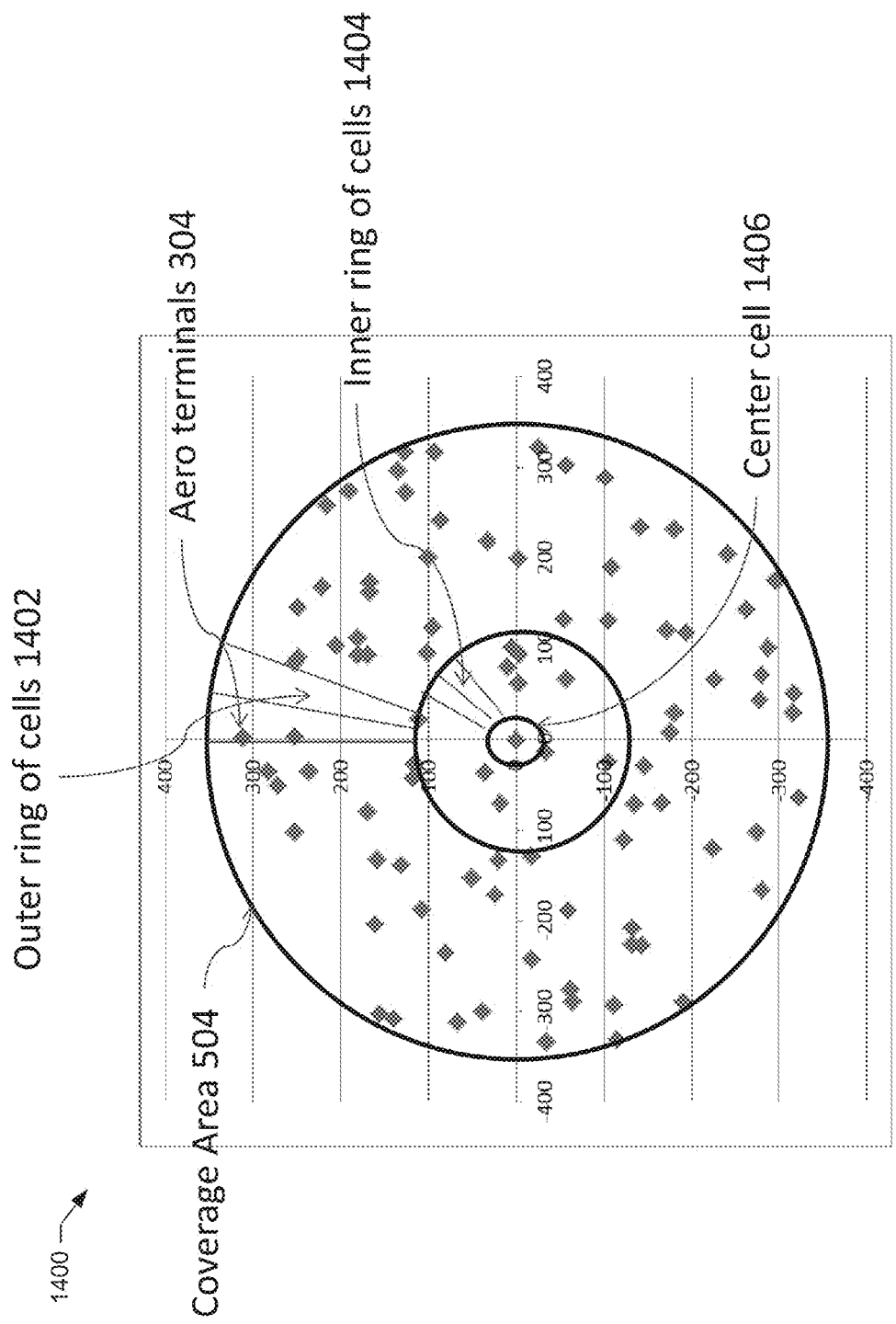
FIG. 14 shows a diagram of an example coverage area including cells configured based on system design parameters and assumptions described above in conjunction with FIGS. 10 to 13, according to an example embodiment of the present disclosure.

FIG. 14 shows a diagram 1400 of an example coverage area 504 including cells 1402, 1404, and 1406 that are configured based on the above described system design parameters and assumptions generated by the example system configuration manager 612 of FIG. 6, according to an example embodiment of the present disclosure. Each of the cells 1402 and 1404 of the outer and inner rings are partitioned into slices of an annular ring. Such a configuration of slices is conducive for the platform 302 providing communication to terminals located within the sky.

Figure 15:
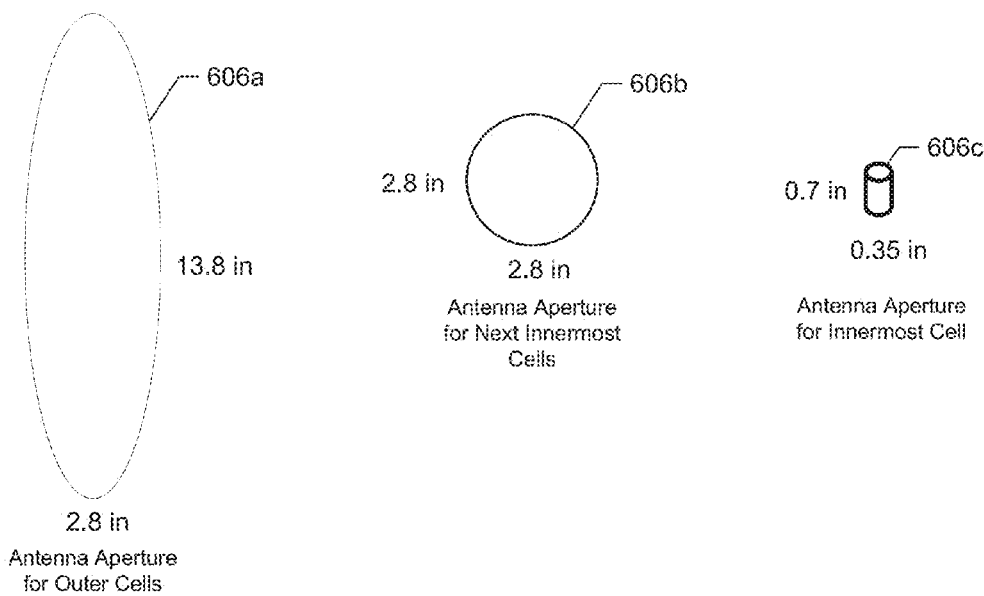
FIG. 15 shows a diagram of an example of different sized antennas for the platform of FIGS. 3 to 14 to provide a uniform user-perceived data rate within a coverage area, according to an example embodiment of the present disclosure.

Each of the example cells 1402, 1404, and 1406 is illuminated by an antenna 606 on the platform 304. Given the system design constraints, the 300 MHz of spectrum is divided into eight frequency channels of 37.5 MHz each. Polarization (e.g., left/right polarization) reuse is employed to double the number of orthogonal channels to sixteen total channels. Ten of these channels are allocated to an outer ring of cells 1402 covering the annulus area between a coverage radius of 124 km and 350 km having a total area of 336,000 $km^2$. This area represents 87% of the total coverage area 504 and on average would service 87% of the aero-based terminals 304. This annulus is divided into 36 cells, each covering ten degrees of azimuth. A possible antenna choice for this coverage would include six separate multi-beam antennas each covering 60 degrees of azimuth. The antenna could include a fixed phased array supporting 6 beams with the azimuthal coverage of each beam being 10°. In this example, the elevation coverage would be 2°. The aperture of each of the six antennas 606a used to produce the beams for the 36 outer cells at 30 GHz would be 13.8×2.8 inches (35.0×7.1 cm). FIG. 15 shows a diagram of the aperture of the six antennas 606a, according to an example embodiment of the present disclosure.

The cells 1404 corresponding to the inner ring of the coverage area 504 have an annular coverage area from 36 km to 124 km radius. Similar to the cells 1402 of the outer ring, the annulus of the inner ring is divided into 36 cells 1404, each covering ten degrees of azimuth. The beams of the antennas 606b corresponding to the cells 1404 would be 10° by 10° and the antenna aperture area would be 2.8×2.8 inches (7.1 cm×7.1 cm) at 30 GHz, as shown in FIG. 15. A possible antenna choice for this coverage would include six separate multi-beam antennas each covering 60 degrees of azimuth. The antenna could include a fixed phased array supporting 6 beams with the azimuthal coverage of each beam being 10°. Two of the eight frequency channels would be allocated to this inner ring of cells 1404. Using polarization reuse provides for an orthogonal spectral reuse of 4 total channels. The coverage area of the inner ring of cells 1404 would be about 44,000 $km^2$. This is 11.5% of the entire coverage area 504 and would accordingly only support about 11 of the aero-based terminals 304 on average. Thus, many or most of the beams may be turned off saving the platform 302 power.

The coverage area 504 of FIG. 14 also includes a center cell 1406 that covers a circular area with a radius of 36 km. The center beam width of the antenna 606c servicing this cell 1406 would be about 75°. A quad-helical end-fire antenna with a height of 0.7 inches and a width of 0.35 inches (1.8×0.9 cm) could be used to provide such a beam width at 30 GHz, as shown in FIG. 15. It should be appreciated that a quad-helical antenna transmits a circular polarized signal where polarization is not well preserved. Also, the sidelobes of the quad-helical antenna are high so that only one frequency channel may be allocated to this beam. On average, only one aero-based terminal 304 would be in this central beam. The antenna on the aero-based terminal 304 could include a polarization-matched quad helix antenna to the quad helix antenna 606c on the platform 302. Alternatively, two quad-helices could be used to receive each of the two circular polarizations. The signals could be optimally combined to match the received polarization perfectly.

Figure 16:
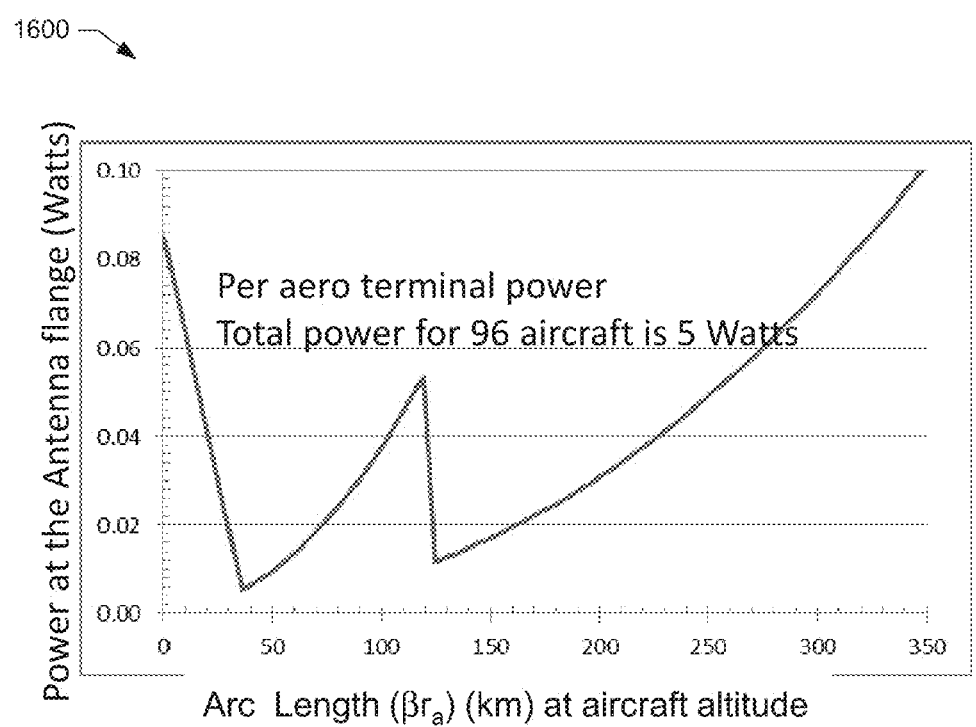
FIG. 16 shows a graph of power per aero-based terminal that the example platform of FIGS. 3 to 15 may be required to transmit to support the 96 aero-based terminals throughout the coverage area of FIG. 14, according to an example embodiment of the present disclosure.

FIG. 16 shows a graph 1600 of the power per aero-based terminal 304 that the example platform 302 may be required to transmit to support the 96 aero-based terminals 304 throughout the coverage area 504 of FIG. 14, according to an example embodiment of the present disclosure. It should be noted that the total power required is five watts, which is the sum of all the power measured at each of the flanges of the antennas 606. It should also be appreciated that the total power needed by the platform 302 may vary based on the number and location of the aero-based terminals 304 within the coverage area 504. For instance, the platform 302 may detect that a number of cells are devoid of aero-based terminals 304 and accordingly reduce (or turn off) power to the corresponding antennas 606. These cells may correspond to, for example, areas that are outside of established commercial air routes.

Figure 17:
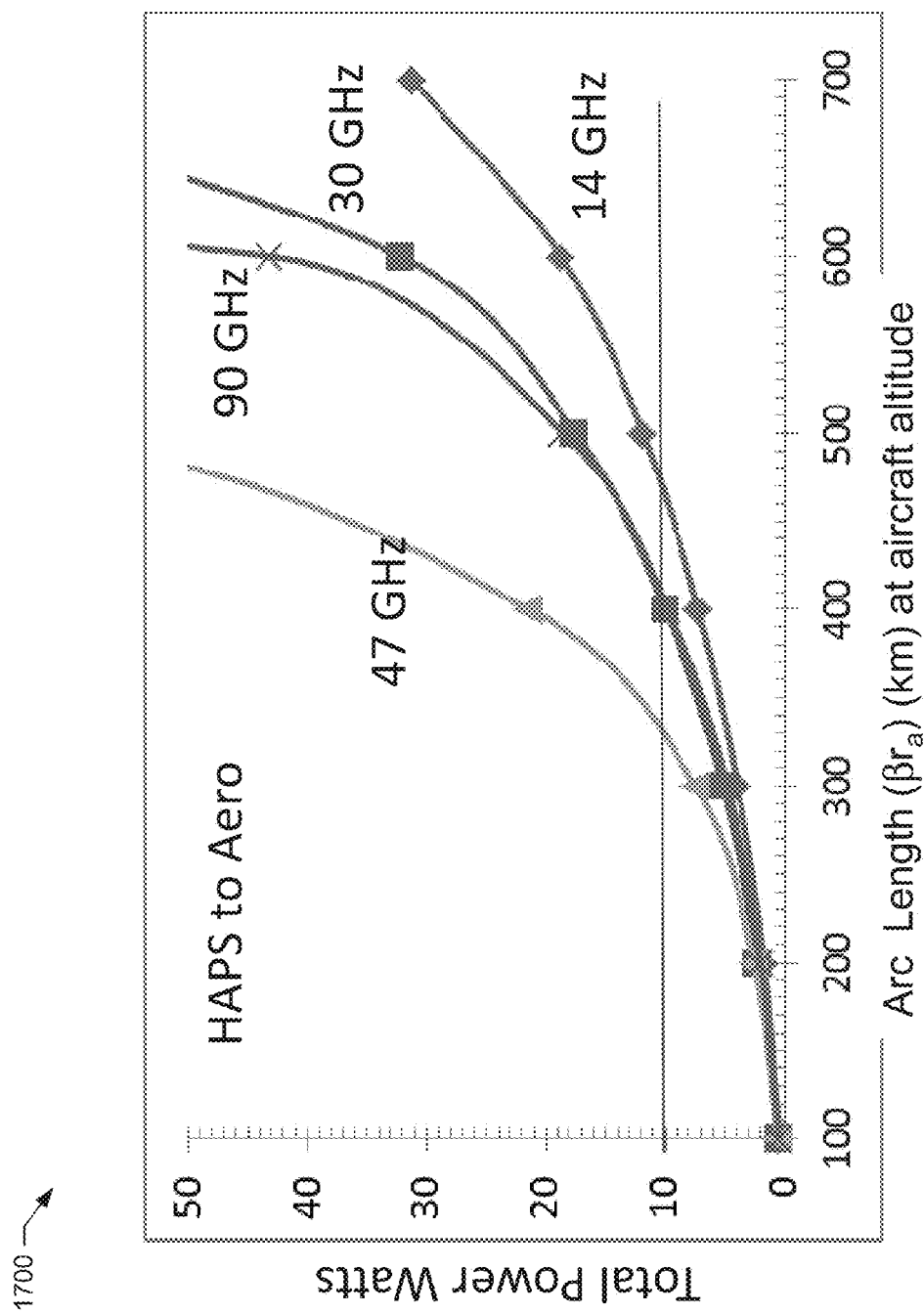
FIG. 17 shows a graph of the total power required of the example platform of FIGS. 3 to 15 for different frequency bands as a function of a coverage radius, according to an example embodiment of the present disclosure.

FIG. 17 shows a graph 1700 of the total power required of the example platform 302 for different frequency bands as a function of the coverage radius 305, according to an example embodiment of the present disclosure. It should be appreciated that the 90 GHz band preforms as well as the 30 GHz band up to a coverage radius 305 of 350 km. However, the 90 GHz band may have more total available spectrum. To use the 47 GHz band, the platform 302 may have to be configured to service a relatively smaller coverage area. Alternatively, the apertures on the antennas 606 of the platform 302 and/or the antennas of the aero-based terminals 304 may have to be increased, thereby increasing the gain, to compensate for the higher power required for the 47 GHz band above 300 km. Of course, in the future the efficiency of power amplifiers may improve so that more total transmit power becomes available at the antenna flanges of the platform 302.

Flowchart of an Example Process

Figure 18:
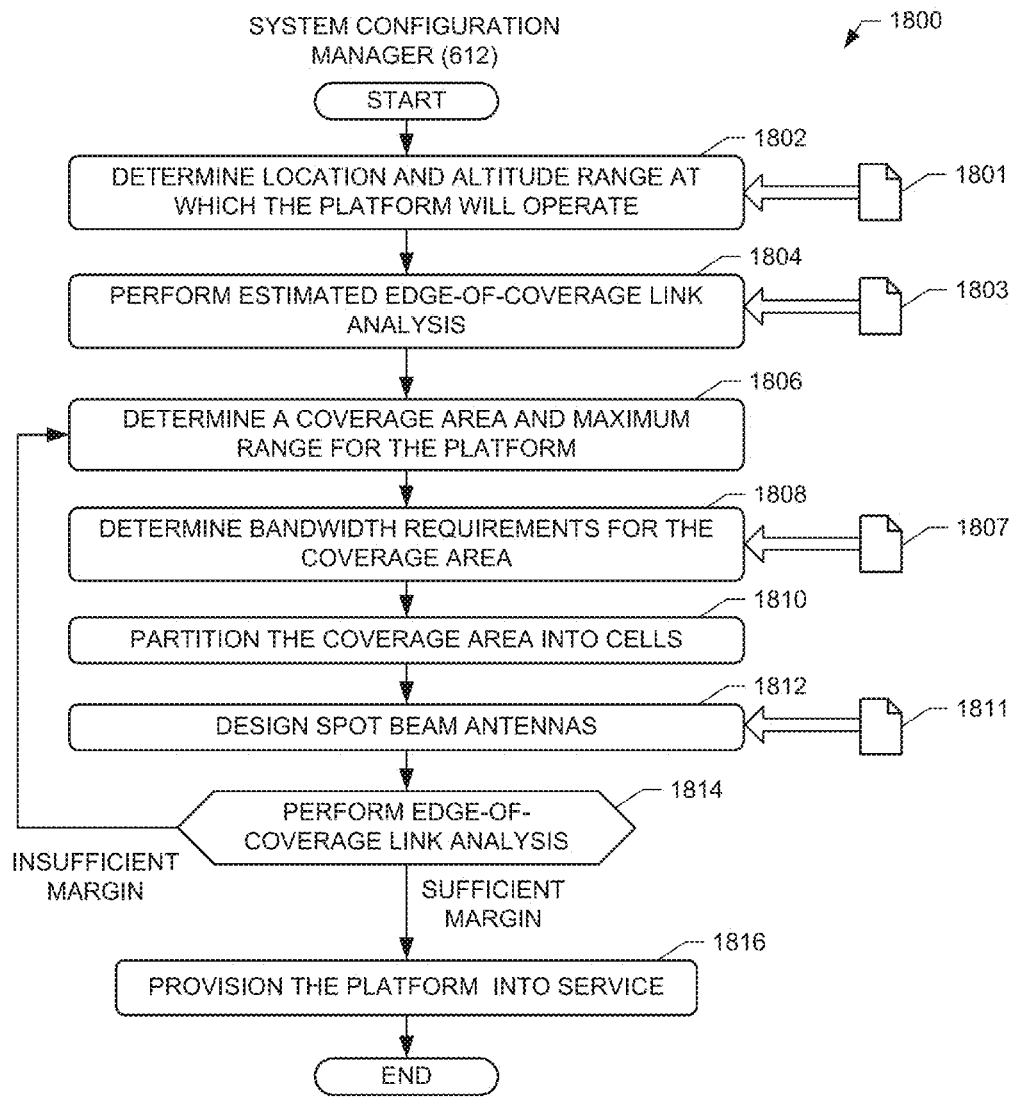
FIG. 18 illustrates a flow diagram showing an example procedure to configure antennas on the example platform of FIGS. 3 to 15 to produce cells with a substantially uniform spectral density and/or QoS for aero-based terminals, according to an example embodiment of the present disclosure.
Figure 19:
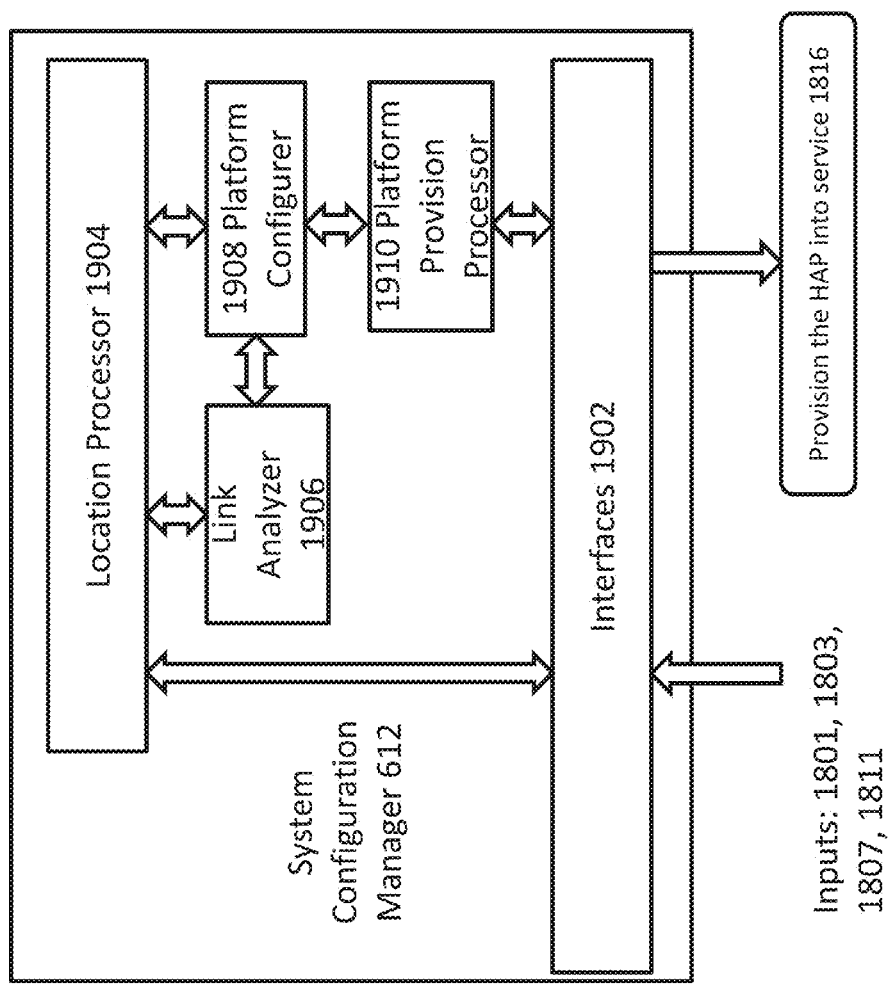
FIG. 19 shows a diagram of the example system configuration manager of FIG. 6 that may be used to execute the procedure described in conjunction with FIG. 18, according to an example embodiment of the present disclosure.

FIG. 18 illustrates a flow diagram showing an example procedure 1800 to configure antennas on the platform 302 of FIGS. 3 to 15 to produce cells with a substantially uniform spectral density and/or QoS for aero-based terminals 304, according to an example embodiment of the present disclosure. FIG. 19 shows a diagram of the example system configuration manager 612 of FIG. 6 that may be used to execute the procedure 1800 described in conjunction with FIG. 18, according to an example embodiment of the present disclosure. Although the procedure 1800 is described with reference to the flow diagram illustrated in FIGS. 18 and 19, it should be appreciated that many other methods of performing the steps associated with the procedure 1800 may be used. For example, the order of many of the blocks may be changed, certain blocks may be combined with other blocks, and many of the blocks described are optional.

Further, the actions described in procedure 1800 may be performed among multiple devices in addition to the system configuration manager 612.

The example procedure 1800 of FIG. 18 operates on, for example, the system configuration manager 612 of FIGS. 6 and 19. The procedure 1800 begins when an interface 1902 the system configuration manager 612 receives a request 1801 to provision a platform (e.g., the platform 302 of FIGS. 3 to 15) for a specified coverage area. The request 1801 may include, for example a latitude (e.g., geographic location) at which the proposed platform will operate. The request 1801 may also include a season of the year in which the platform will operate. Responsive to the request 1801, a location processor 1904 of the system configuration manager 612 determines an altitude at which the HAP will operate (block 1802). The altitude may depend on the altitude of the tropopause, where the atmospheric winds are minimal. This altitude may also depend on the latitude of the coverage area.

A link analyzer 1906 of the system configuration manager 612 may also perform a preliminary edge-of-coverage link analysis based on system parameters 1803 (e.g., the design parameters of table 1000 of FIG. 10) and the proposed altitude and geographic location of the platform (block 1804). The system parameters 1803 may include, for example, available frequency spectrum and rain/atmospheric absorption fade statistics. The system parameters 1803 may also include aero-based terminal design constraints, platform design constraints, and antenna constraints.

A platform configurer 1908 of the system configuration manager 612 uses the link analysis performed by the link analyzer 1906 to determine a maximum communication range for the proposed platform (block 1806). The platform configurer 1908 may also use the proposed altitude and maximum communication range to determine a coverage area for the specified area. The platform configurer 1908 uses an estimate of a number of aero-based terminals in the coverage area 1807 to determine bandwidth requirements and/or QoS requirements/parameters for the coverage area (block 1808). The platform configurer 1908 then partitions the coverage area into cells (block 1810). In some instances, the cells may be slices of an annular ring and/or equal-sized hexagonal cells. After partitioning the coverage area, the example platform configurer 1908 is configured to design spot beam antennas for the HAP (block 1812). Designing an antenna includes, for example, determining a beamwidth, elevation angle, and/or gain for each antenna to provide communication coverage to the respective cell according to the bandwidth requirements and/or QoS requirements. Designing an antenna also includes determining an aperture size and/or an antenna type based on the determined beamwidth, elevation angle, and/or gain. The example platform configurer 1908 may also use link performance requirements 1811 and/or the availability of antenna designs to determine the aperture size and/or an antenna type for each of the antennas.

The example link analyzer 1906 then performs a link analysis to determine if there is adequate link margin for the required level of service (block 1814). If there is sufficient margin, a platform provision processor 1910 of the system configuration manager 612 prepares the platform for provisioning into service (block 1816). For example, the platform provision processor 1910 may cause an assembly machine and/or an assembly team to create the platform based on system requirements determined in blocks 1802 to 1814. The platform provision processor 1910 may instruct a launch system to deploy the created platform. In some embodiments, the platform provision processor 1910 may store a data structure of the parameters of the platform to a database. The parameters may be later accessed to service the platform or transmit software updates to the platform. The example procedure 1800 then ends until another platform is requested to be provisioned into service. The example procedure 1800 may also begin again if the platform is returned from operation for an upgrade and/or modification. However, it should be noted that if a phased array antenna is used instead of individual antennas on the platform, the platform provision processor 1910 may configure the beam forming coefficients of the phased array antenna to form new spot beams while the platform is in the sky.

Returning to block 1818, if there is insufficient margin, the example procedure 1800 returns to block 1806. At this point the platform configurer 1908 determines a modified coverage area, elevation angle, and/or range that provides sufficient margin. For example, a smaller coverage area may be necessary or the number of cells may need to be increased.

CONCLUSION

It will be appreciated that all of the disclosed methods and procedures described herein can be implemented using one or more computer programs or components. These components may be provided as a series of computer instructions on any computer-readable medium, including RAM, ROM, flash memory, magnetic or optical disks, optical memory, or other storage media. The instructions may be configured to be executed by a processor, which when executing the series of computer instructions performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

It should also be understood that a telecommunications platform providing substantially uniform QoS or communication coverage using the methods described herein may be an element of a larger system. Examples of larger system include relays between HAPs, relays between HAPs and GEO satellites, relays between HAPs to gateways shared by those HAPs, relays between gateways and GEO satellites, etc.

The invention is claimed as follows:

1. A telecommunications platform apparatus comprising:
   a plurality of user link antennas each configured to provide communication coverage for a plurality of aero-based terminals within a specified volume of the sky, each antenna being configured to communicate with a specified cell within the specified volume; and
   a gateway link antenna configured to provide communication coverage to a ground-based gateway terminal,
   wherein the plurality of user link antennas are configured such that:
   a first set of the plurality of user link antennas each has a first size aperture and are allocated a first number of channels, and a second set of the plurality of user link antennas each has a second size aperture that is less that the first size aperture and are allocated a second number of channels that is less than the first number of channels, and wherein the first size aperture and the second size aperture in combination with the different number of channels allocated between the first and second sets of the plurality of user link antennas maintain substantially the same communication quality among the specified cells within the specified volume of the sky.

2. The apparatus of claim 1, wherein the telecommunications platform includes at least one of a high altitude platform, a low Earth orbit satellite or a mid-Earth orbit satellite.

3. The apparatus of claim 1, further comprising a switch configured to:
receive communication data at one of the user link antennas from one of the plurality of aero-based terminals; and
transmit the communication data via the gateway link antenna to the gateway terminal.

4. The apparatus of claim 1, further comprising a switch configured to:
receive communication data at the gateway link antenna from the gateway terminal;
determine a destination cell within the specified volume for the communication data;
select one of the plurality of user link antennas corresponding to the destination cell to transmit the communication data; and
transmit the communication data via the selected one of the plurality of user link antennas.

5. The apparatus of claim 1 further comprising a controller configured to at least one of mechanically and electrically point the gateway link antenna at the gateway terminal.

6. The apparatus of claim 1, wherein the telecommunications platform apparatus communicates with a second telecommunications platform apparatus via a communications link between the first telecommunications platform apparatus and the second telecommunications apparatus.

7. The apparatus of claim 1, wherein the first set of the plurality of user link antennas are configured to provide coverage for first cells, of the specified cells, that are located at outer edges of the specified volume of the sky and the second set of the plurality of the user link antennas are configured to provide coverage for second cells, of the specified cells, that are located within a center of the specified volume of the sky.

8. The apparatus of claim 1, wherein the telecommunications platform apparatus includes a high altitude platform that operates between 17 km and 22 km above ground.

9. The apparatus of claim 1, wherein the plurality of antennas are configured to provide substantially uniform quality of service ("QoS") to each of the plurality of aero-based terminals.

10. The apparatus of claim 1, wherein the telecommunications platform apparatus is communicatively coupled to a GEO satellite.

11. The apparatus of claim 1, wherein the telecommunications platform apparatus includes a controller configured to at least one of mechanically and electrically control the plurality of the user link antennas such that the specified cells remain substantially stationary.

12. The apparatus of claim 1, wherein the telecommunications platform apparatus is configured such that communication coverage among the plurality of aero-based terminals is provided at least 4 km above a surface of the Earth.

13. The apparatus of claim 1, wherein the plurality of user link antennas are configured such that the specified cells compensate for air traffic patterns of the plurality of aero-based terminals.

14. The apparatus of claim 1, wherein the telecommunications platform apparatus is configured to turn off power to at least some of the user link antennas responsive to determining an aero-terminal is not within the specified cells.

15. The apparatus of claim 1, wherein the plurality of user link antennas are configured such that:
the first set of the plurality of user link antennas are each configured to provide communication coverage to a first equal sized volume within an outer ring of the specified volume; and
the second set of the plurality of user link antennas are each configured to provide communication coverage to a second equal sized volume within an inner ring of the specified volume,
wherein the plurality of user link antennas are configured to operate within a 300 MHz frequency spectrum at approximately 30 GHz, the 300 MHz frequency spectrum being divided into 8 frequency channels each having a bandwidth of 37.5 MHz.

16. The apparatus of claim 15, wherein
5 of the 8 channels are allocated for the outer ring, which has a coverage radius between 124 km and 350 km and is divided into 36 separate cells each covering 10° of azimuth of the outer ring, and
the first set of user link antennas includes six multi-beam antennas each configured to cover 60° of the azimuth of the outer ring, the first size aperture having dimensions of 35 cm by 7.1 cm.

17. The apparatus of claim 15, wherein
2 of the 8 channels are allocated for the inner ring, which has a coverage radius between 36 km and 124 km and is divided into 36 separate cells each covering 10° of azimuth of the inner ring, and
the second set of user link antennas includes six multi-beam antennas each configured to cover 60° of the azimuth of the inner ring, the second size aperture having dimensions of 7.1 cm by 7.1 cm.

18. The apparatus of claim 15, wherein
1 of the 8 channels is allocated for a center volume of the specified volume, which has a radius of 36 km and includes one cell covering an entire center volume, and
the second set of user link antennas includes a center user link antenna configured to cover the center volume, the center user link antenna being an end-fire antenna having dimensions of 1.8 cm by 0.9 cm.

19. A method to provision a telecommunications apparatus comprising:
determining an altitude range at which the telecommunications apparatus will operate;
determining a maximum communication range of the telecommunications apparatus;
determining a coverage area of the telecommunications apparatus based on the altitude range and the maximum communication range, the coverage area corresponding to a location in the sky that includes aero-based terminals;
partitioning the coverage area into substantially equal-sized cells;
assigning an antenna, of a plurality of antennas, to each of the substantially equal-sized cells;

determining a channel for each of the plurality of antennas;

determining a beamwidth and an elevation angle for each of the plurality of antennas to provide communication coverage to the corresponding substantially equal-sized cell; and determining an aperture for each of the plurality of antennas based on the beamwidth and the elevation angle to provide the substantially equal-sized cells, wherein the aperture determination in combination with the channel determination maintain a substantially uniform communication quality among the substantially equal-sized cells.

20. The method of claim 19, wherein the apertures of the plurality of antennas corresponding to cells at outer edges of the coverage area have a larger size than apertures of antennas corresponding to cells within a center of the coverage area.

21. The method of claim 19, further comprising:
partitioning an outer portion of the coverage area into a first subset of substantially equal-sized cells; and
partitioning an inner portion of the coverage area into a second subset of substantially equal-sized cells.

22. The method of claim 21, wherein
the outer portion of the coverage area includes a first annular ring and the first subset of substantially equal-sized cells includes slices of the first annular ring; and
the inner portion of the coverage area includes a second annular ring and the second subset of substantially equal-sized cells include slices of the second annular ring.

23. The method of claim 19, further comprising:
determining at least one of the substantially equal-sized cells is devoid of an aero-based terminal; and
turning off power to an antenna that provides communication coverage to the determined substantially equal-sized cell.

* * * * *